United States Patent [19]

Holtey et al.

[11] Patent Number: 4,965,721
[45] Date of Patent: Oct. 23, 1990

[54] FIRMWARE STATE APPARATUS FOR CONTROLLING SEQUENCING OF PROCESSING INCLUDING TEST OPERATION IN MULTIPLE DATA LINES OF COMMUNICATION

[75] Inventors: Thomas O. Holtey, Newton, Mass.; Thomas L. Murray, Jr., Hollis, N.H.; Wayne A. Perzan, Holbrook, Mass.; Scott W. Smith, Hudson, N.H.

[73] Assignee: Bull HN Information Systems Inc., Billerica, Mass.

[21] Appl. No.: 32,896

[22] Filed: Mar. 31, 1987

[51] Int. Cl.[5] .................. G06F 3/00; G06F 13/12; G06F 13/38; G06F 11/28
[52] U.S. Cl. ...................... 364/200; 364/222.2; 364/222.3; 364/238.3; 364/249.5; 364/244.6; 364/260.1; 364/919.5; 364/927.96; 364/927.98; 364/960.68
[58] Field of Search ... 364/200 MS File, 900 MS File

[56] References Cited

U.S. PATENT DOCUMENTS

| | | | |
|---|---|---|---|
| 3,651,482 | 3/1972 | Benson et al. | 364/200 |
| 4,133,030 | 1/1979 | Huettner et al. | 364/200 |
| 4,201,887 | 5/1980 | Burns et al. | 364/900 |
| 4,481,574 | 11/1984 | Defino et al. | 364/200 |
| 4,482,982 | 11/1984 | Yu et al. | 364/900 |
| 4,484,306 | 11/1984 | Kulczyskyj et al. | 364/900 |
| 4,488,231 | 12/1984 | Yu et al. | 364/200 |
| 4,748,656 | 5/1988 | Gibbs et al. | 379/94 |
| 4,831,520 | 5/1989 | Rubinfeld et al. | 364/200 |
| 4,851,991 | 7/1989 | Rubinfeld et al. | 364/200 |
| 4,881,230 | 11/1989 | Clark et al. | 371/20.1 |

Primary Examiner—Archie E. Williams, Jr.
Assistant Examiner—Ayni Mohamed
Attorney, Agent, or Firm—David M. Driscoll; Faith F. Driscoll; John S. Solakian

[57] ABSTRACT

A firmware state apparatus for controlling data transfer on multiple independent data lines between a telephone communications system and computer system. At least one processor having a program counter is employed for control data transfer. A processor memory is associated with the processor and has a plurality of firmware instructions divided into groups based upon the number of predefined states which are required for performing data transfer. Certain groups of instructions include test instructions for evaluating conditions related to the line to control sequencing to a next one of the predefined states. A shared memory has a plurality of locations for line table information for at least one line with at least one location containing a program counter address specifying a starting instruction of a corresponding one of the group of instructions to be executed by the processor. The processor, in response to the group of instructions, performs a designated operation for the line and in particular in response to the test instruction loads a new value corresponding to the starting instruction of the group of instructions of the next state.

36 Claims, 23 Drawing Sheets

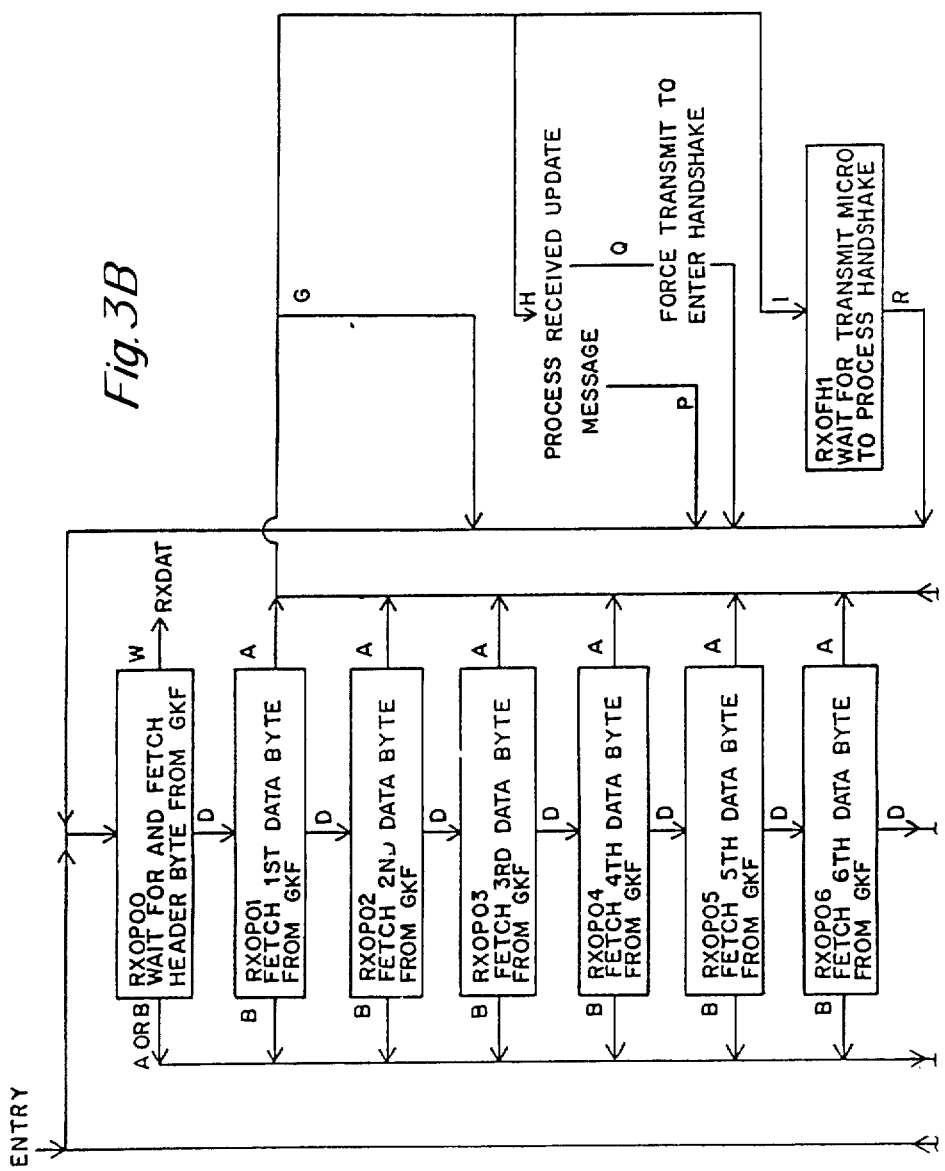

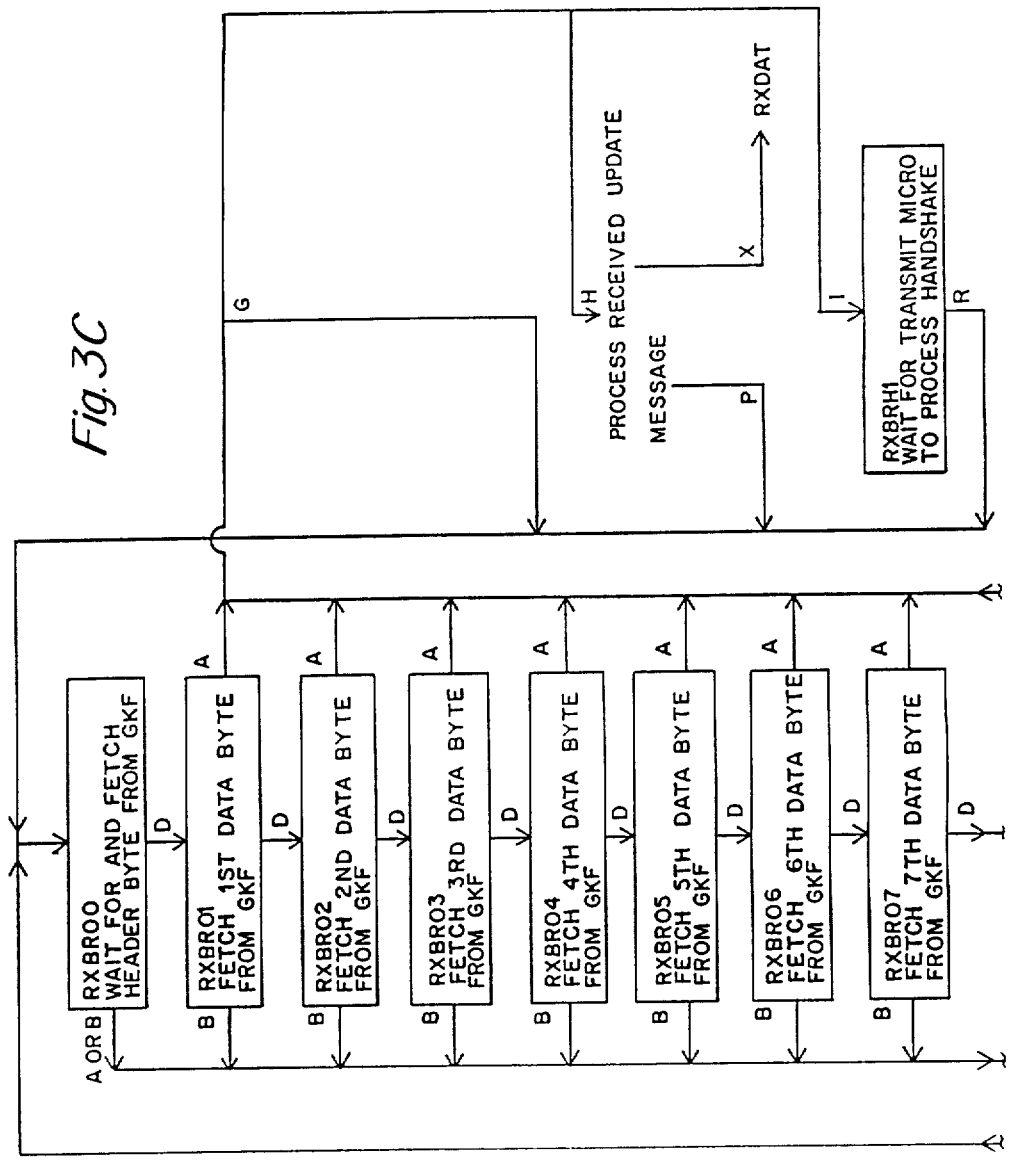

Fig. 4

LINE TABLE                                                                                           AT $10100

|   | 0 | 1 | 2 | 3 | 4 | 5 | 6 | .7 | 8 | 9 | A | B | C | D | E | F |
|---|---|---|---|---|---|---|---|----|---|---|---|---|---|---|---|---|
| 0 | TXSUSAD | RXSUSAD | | | TXCATAD | | RXCATAD | | TXCATPC | | | | RXCATPC | | | |
| 1 | RXMSG<br>RECEIVE MESSAGE BUFFER | RXMSG1 | RXMSG2 | RXMSG3 | RXMSG4 | RXMSG5 | RXMSG6 | RXMSG7 | RXMSG8 | RXMSG9 | | | | | | |
| 2 | HSKMSG<br>TRANSMIT HANDSHAKE MESSAGE | HSKMSG1 | HSKMSG2 | HSKMSG3 | HSKMSG4 | HSKMSG5 | HSKMSG6 | HSKMSG7 | HSKMSG8 | | | | | | | |
| 3 | TXMSG<br>TRANSMIT MESSAGE BUFFER | TXMSG1 | TXMSG2 | TXMSG3 | ... | | | | UPMSG<br>TRANSMIT UPDATE MESS. | UPMSG1 | UPMSG2 | | RXUPM<br>RECEIVE UPDATE HISTORY | RXUPM1 | RXUPM2 | ... |
| 4 | RXSUBA1 | TXSUBA1 | | | RXSUBA2 | | TXSUBA2 | | RXSUBA3 | | | | TXOFMV | | RXRSTAD | |
| 5 | RXTIME<br>RECEIVE WAKEUP | | TXTIME<br>TRANSMIT WAKEUP | | UPTIME<br>UPDATE TIME | LPMFLG | RXMETER | | TXDLY1 | | TXDLY2 | | TXDLY3 | | TXDLY1X | |
| 6 | HSKCT | | HSKFLG | TESTFLG | ESTFLG | LPMFLG | DULPM | MONFLG | RXWRAP | RXTICK | ESTCT | DLDOT | NOGKFCT | LR4HIS | | |
| 7 | RXCRID | RXCRI | TXCRI | TXCRID | RXCRIW | | | LPMDAT | RXCRCTX | RXCRCT | RXMSCT | RXUPCT | RXTRCT | | DWNCT | |
| 8 | | | | | | | | | RXTAAD | | | | | | | |
| 9 | | | | | | | | | | | | | | | | |
| A | | | | | | | | | | | | | RXGCAD | | | |
| B | SAMHOOK | | RXBADS | | | | | | | | | | | | | |
| C | PBXHOOK | HKFLG | DWNFLG | | | | | | | | | | TALAD | | | |
| D | TXSTATE | TXALRI | RXSTATE | RXALRI | | | LINEMSK | | MYSIG | | MYSIGSK | | | | DXRDYQ | LINENUM |
| E | ADAPID | FLAPID | LINE<br>MODE | MAXRATE | METER<br>MOD | | | | HSKDLY | | HSK4<br>EVER | | | | | |
| F | | | | | | | | | | | | | | | LINE # | |

Fig. 5A

| | | | |
|---|---|---|---|
| RXDWN3Z | MOVE.W | #RXDWN4, (A4) | [===] SET SUSPEND |
| . | | | |
| RXDWN4 | MOVE.W | #1025,DWNCT (A0) | INITIALIZE COUNTER |
| | CLR.L | D0 | CLEAR D0 |
| | MOVE.B | D0,GKAWSWTI (A3) | . GKF WRITE 0 TO STATUS, WRAP & TICK |
| | MOVE.B | D0,GKAWSWTI (A3) | . AND INCREMENT TAKE POINTER |
| | MOVE.B | D0,GKAWSWTI (A3) | . FOUR TIMES PER PASS |
| | MOVE.B | D0,GKAWSWTI (A3) | |
| | SUBQ.W | #1,DWNCT (A0) | DECREMENT COUNTER |
| | BEQ.S | RXDWN4A | . IF ZERO, BRANCH |
| | MOVE.B | D0,RXCHN (A3) | ..... LOOP |
| | MOVE.W | (A4),A5 | .... |
| | JMP | (A5) | ... SUSPEND |

Fig. 5B

| | | | |
|---|---|---|---|
| RXDA01 | MOVE.B | GKARS(A3),D0 | READ GIGANTIC KINETIC STATUS |
| RXDA01A | CMP.B | #GKOKEND,D0 | TEST FOR NORMAL END OF MESSAGE |
| | BNE.S | RXDA01C | .IF NOT, BRANCH |
| . | | | |
| | MOVE.B | (A3),RXMSG1(A0) | STORE GKF DATA BYTE #1 |
| | MOVE.B | #0,GKAWSI(A3) | .CLEAR GKF STATUS & INCREMENT TAKE |
| | MOVE.B | #1,RXMSCT(A0) | . LOAD MESSAGE LENGTH COUNT |
| | BRA | RXDAD | . DELIVER DATA |
| | | | |
| RXDA01B | MOVE.W | #RXDA01,(A4) | [===] SET SUSPEND AT RXDA01 |
| | JSR | RXGKE(PC) | .CALL EXCEPTION HANDLER |
| | BRA.S | RXDA01A | . REDO TESTS |
| RXDA01C | CMP.B | #GKOKDAT,D0 | TEST FOR NORMAL DATA |
| | BNE.S | RXDA01B | .IF NOT, BRANCH |
| | MOVE.B | (A3),RXMSG1(A0) | .IF SO, STORE GKF DATA BYTE #1 |
| | MOVE.B | #0,GKAWSI(A3) | . CLEAR GKF STS & INCREMENT TAKE |
| . | | | |
| RXDA02 | MOVE.B | GKARS(A3),D0 | READ GIGANTIC KINETIC STATUS |
| RXDA02A | CMP.B | #GKOKEND,D0 | TEST FOR NORMAL END OF MESSAGE |
| | BNE.S | RXDA02C | .IF NOT, BRANCH |
| . | | | |
| | MOVE.B | (A3),RXMSG2(A0) | STORE GKF DATA BYTE #2 |
| | MOVE.B | #0,GKAWSI(A3) | .CLEAR GKF STATUS & INCREMENT TAKE |
| | MOVE.B | #2,RXMSCT(A0) | . LOAD MESSAGE LENGTH COUNT |
| | BRA | RXDAD | . DELIVER DATA |
| | | | |
| RXDA02B | MOVE.W | #RXDA02,(A4) | [===] SET SUSPEND AT RXDA02 |
| | JSR | RXGKE(PC) | .CALL EXCEPTION HANDLER |
| | BRA.S | RXDA02A | . REDO TESTS |
| RXDA02C | CMP.B | #GKOKDAT,D0 | TEST FOR NORMAL DATA |
| | BNE.S | RXDA02B | .IF NOT, BRANCH |
| | MOVE.B | (A3),RXMSG2(A0) | .IF SO, STORE GKF DATA BYTE #2 |
| | MOVE.B | #0,GKAWASI(A3) | . CLEAR GKF STS & INCREMENT TAKE |
| . | | | |

```
RXDA03    MOVE.B  GKARS (A3),D0         READ GIGANTIC KINETIC STATUS
RXDA03A   CMP.B   #GKOKEND,D0           TEST FOR NORMAL END OF MESSAGE
          BNE.S   RXDA03C               .IF NOT, BRANCH

MOVE.B  (A3), RXMSG3 (A0)     STORE GKF DATA BYTE #3
          MOVE.B  #0, GKAWSI (A3)       .CLEAR GKF STATUS & INCREMENT TAKE
          MOVE.B  #3, RXMSCT (A0)       . LOAD MESSAGE LENGTH COUNT
          BRA     RXDAD                 . DELIVER DATA

RXDA03B   MOVE.W  #RXDA03, (A4)         [===] SET SUSPEND AT RXDA03
          JSR     RXGKE (PC)            .CALL EXCEPTION HANDLER
          BRA.S   RXDA03A               .REDO TESTS
RXDA03C   CMP.B   #GKOKDAT,D0           TEST FOR NORMAL DATA
          BNE.S   RXDA03B               .IF NOT, BRANCH
          MOVE.B  (A3), RXMSG3 (A0)     . IF SO, STORE DATA BYTE #3
          MOVE.B  #0, GKAWSI (A3)       . CLEAR GKF STS & INCREMENT TAKE
```

*Fig. 5B* CONTINUED

FIRMWARE STATE APPARATUS FOR CONTROLLING SEQUENCING OF PROCESSING INCLUDING TEST OPERATION IN MULTIPLE DATA LINES OF COMMUNICATION

RELATED APPLICATION

The following U.S. patent application filed on an even date with the instant application and assigned to the same assignee as the instant application, is related to the instant application.

"Dual Microprocessor Control System" by Thomas Holtey, et al U.S. Ser. No. 032,902, filed Mar. 31, 1987.

BACKGROUND OF THE INVENTION

Field of the Invention

The present invention relates in general to a data communication system and pertains, more particularly, to a data communication system that provides for the transfer of data information, control information and signalling information between a telephone system and a computer system.

Description of the Prior Art

In systems of the type described above, it is typical to provide an interrupt-driven operating system wherein, each time an event occurs, which requires the attention of the firmware or software an interrupt is generated thus directing the attention of the microprocessor to the particular need for that line. One problem with such an interrupt driven system is that when interrupts occur they are typically at random times. Also, there is a great deal of context within the microprocessor that must be "saved off". That is, when an interrupt occurs all of these registers have to be stored-off in the memory and then retrieved because there is no prior knowledge of whether or not there is significant data that must be retained and placed back into the registers when the interrupt task is resumed. This context swapping is very time consuming and it may take many machine cycles to store off the context. Typically, for instance, it may take as many as 20 to 30 microseconds to take an interrupt and return.

In the environment of the present invention it is desired to complete the processing of every character within a maximum of 60 microseconds. This is the time that is allotted per character when one is exercising 16 lines that are each of 960 characters per second rate. The interrupt-driven scheme with context swapping typically requires a great deal of processing overhead.

An operating system in a computer typically serves to organize and direct the attention of the processor among a variety of tasks and typically is a multi-tasking system which is capable of controlling a number of tasks simultaneously. In a normal operating system many of these tasks are things that do not have real time requirements, per se. Time allocation may be necessary to insure proper accessing to all lines. It is typical for the operating system to be structured so that it works on high priority work for a period of time and then reverts to lower priority work. Now, one of the serious drawbacks associated with interrupt-driven operating system types of control is the efficiency of operation. It is not unusual to use 10 to 40 percent of the processors power to feed the operating system so that it can make decisions as to how to allocate work. This thus creates problems, particularly in an environment where there is not sufficient time allocated for both carrying out the work and decision making regarding the work.

Another prior art technique is to employ a polling loop in which the firmware sequences from line lo line and looks for particular activities then paying attention to the line requiring activity. This scheme is very inefficient in operation in that a great deal of time is devoted to searching through the loops and that takes away from the time for carrying out the necessary work tasks.

OBJECTS OF THE INVENTION

Accordingly, it is an object of the present invention to provide an improved data communication system employing a firmware state apparatus.

Another object of the present invention is to provide a firmware state apparatus as in accordance with the preceeding object and which is characterized by reduced processor overhead.

Still another object of the present invention is to provide a firmware state apparatus for use in controlling data transfer between a telephone communication system and computer system, and in which the machine does not necessarily require the use of an operating system thus substantially simplifying the task handling capabilities.

A further object of the present invention is to provide a firmware state apparatus as in accordance with the preceeding objects, and which eliminates the problems associated with interrupt-driven and polling scheme systems.

SUMMARY OF THE INVENTION

To accomplish the foregoing and other objects, features and advantages of the invention, in accordance with the broad aspects thereof, there is provided a firmware state apparatus for controlling data transfer on multiple independent data lines between a telephone communication system and computer system. The apparatus of the invention comprises at least one processor and an associated processor memory. The processor memory has a plurality of firmware instructions stored therein with these instructions divided into groups based upon the the number of predefined states that are required for providing data transfer between the telephone communication system and computer system. The program instructions stored in the processor memory are herein termed "firmware". Certain groups of instructions include one instruction defining a test operation for evaluating conditions related to the line to control sequencing to a next one of a predefined states. A shared memory is provided having a plurality of locations for line table information for at least one line. At least one location thereof contains an address, preferably a program counter address specifying a starting instruction of a corresponding one of the group of instructions to be executed by the processor for that line. The processor, in response to the group of instructions, performs a designated operation for that line, and in response to the test instruction as a function of said condition, loads a new value corresponding to the starting instruction of the group of instructions of the next one of the states. The processor preferably includes a program counter and the shared memory location contains a corresponding program counter address. The processor in the disclosed embodiment comprises first and second microprocessors including a transmit microprocessor and a receive microprocessor. The groups of instructions further include at least one instruction defining a suspend operation. This controls the suspension of operation on one line for enabling the processor to service another line, or alternatively return to the same line at a later time. The suspend operation may be defined by multiple instructions. Additional instructions in certain groups are also provided for carrying out work tasks for enabling data transfer between telephone communication and computer systems. In the preferred embodiment the shared memory has line table information for all data lines stored separately on a line-by-line basis. Means are provided for controlling the processor to access only one line table at a time in some predetermined sequence in which all line tables obtain access. Each line table contains an address identified as a suspend address representative of the predefined state to be returned to upon attaining access to that data line again. Certain groups of instructions also include at least one instruction for setting a suspend address to thus load a new value into the program counter corresponding to the starting instruction of the group of instructions of the next one of the states. In addition to the setting of a suspend address there is also the aforementioned instruction defining a suspend operation to thus carry out the suspending of operation on one line for enabling the processor to either return to the same line at a later time or to service another line at a later time.

As indicated previously, one of the aspects of the firmware state apparatus of the present invention is concerned with the use of the suspend feature, which is a means by which the control can move from line-to-line in controlling data transfer. An important aspect of the suspend operation is that there is no register context that need be saved when converting from one task to another. All of the context is stored in the line table store itself. There is a line table associated with each line. There is nothing to store off except, possibly, the program counter position itself so that the system knows where to pick-up and resume processing on the line when it is appropriate to do so at a later time.

Another aspect of the firmware state apparatus of the present invention is that the firmware code are designed so that a minimal amount of time is spent in a particular state, particularly if in a "waiting" state. In such a state, a test is performed to determine whether a task is to be carried out and, if not, the system proceeds to the next state. If the test indicates that a suspension is to be performed then the system switches control to the next line to carry out further work and tests. Thus, minimal time is expended in testing for non-work, waiting conditions.

Still another aspect of the present firmware state apparatus is the fact that as the work load increases there is a larger percentage of the machine cycle expended in doing useful work because the tests become less frequent. Therefore, as the machine gets busier, the amount of overhead, (the overhead being the time it takes to actually process the suspend at each state) becomes, a smaller percentage of the overall machine processing time. Thus, in accordance with the concepts of the invention there is provided an apparatus that, as it becomes busier, drops off overhead rather than as in an interrupt driven system, which, as it becomes busier, picks up additional overhead.

BRIEF DESCRIPTION OF THE DRAWINGS

Numerous other objects, features and advantages of the invention should now become apparent upon a reading of the following detailed description taken in conjunction with the accompanying drawings, in which:

FIG. 4 is a line table diagram for one of the sixteen line tables stored;

FIGS. 5A and 5B provide two different representative firmware listings;

DETAILED DESCRIPTION

Figure 1:
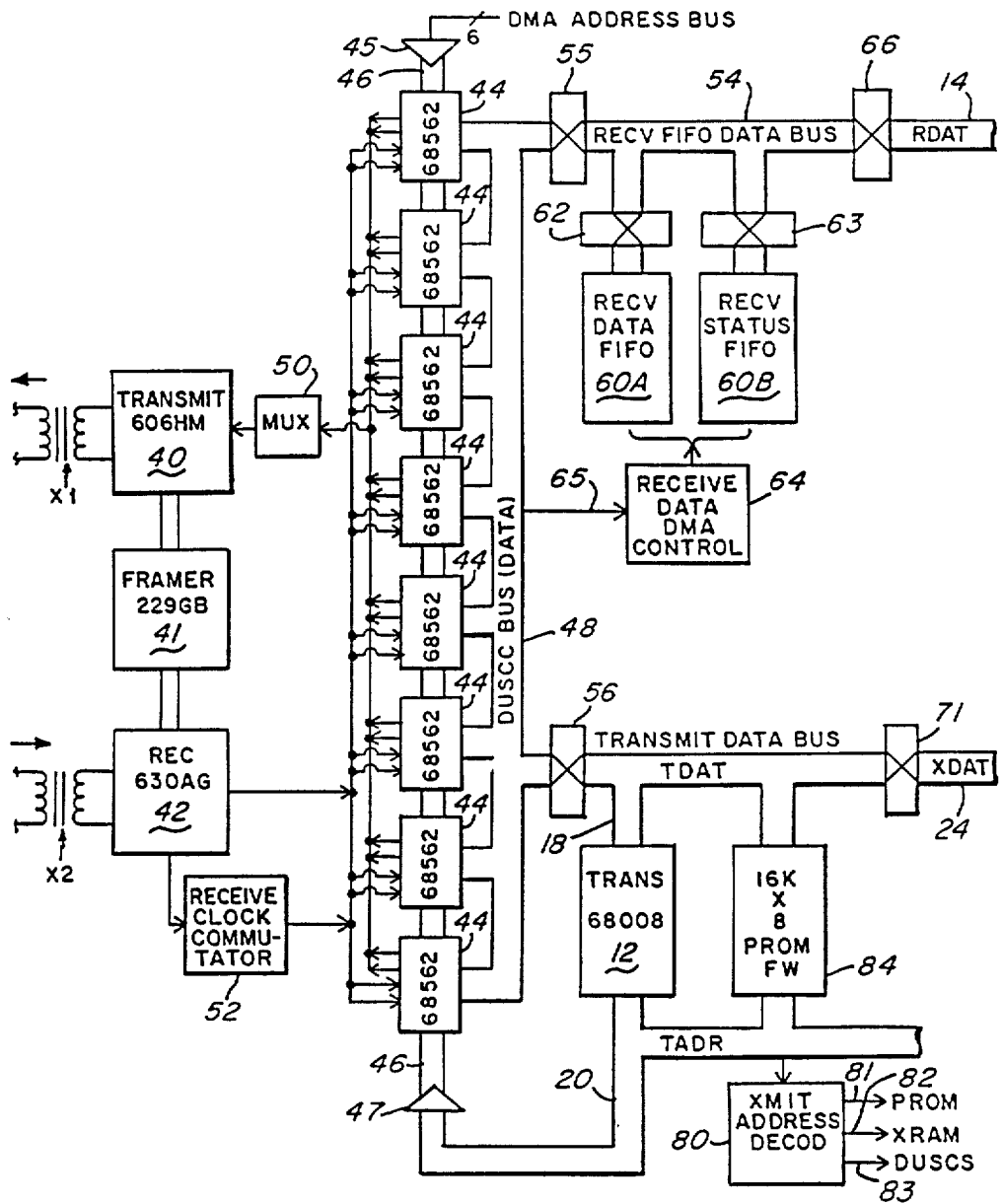
FIG. 1 is a block diagram of a data communications system showing the hardware employed in association with the firmware concepts of the invention.
Figure 1:
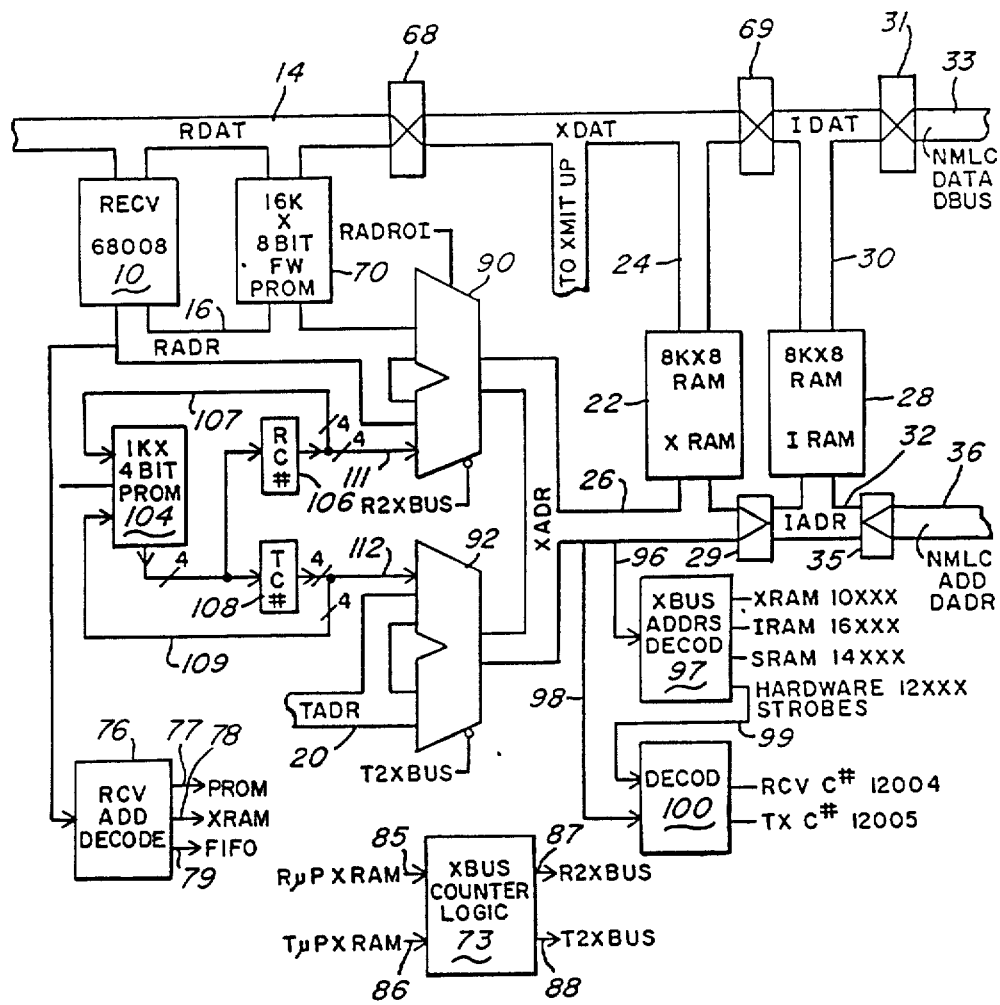
Figure 2:
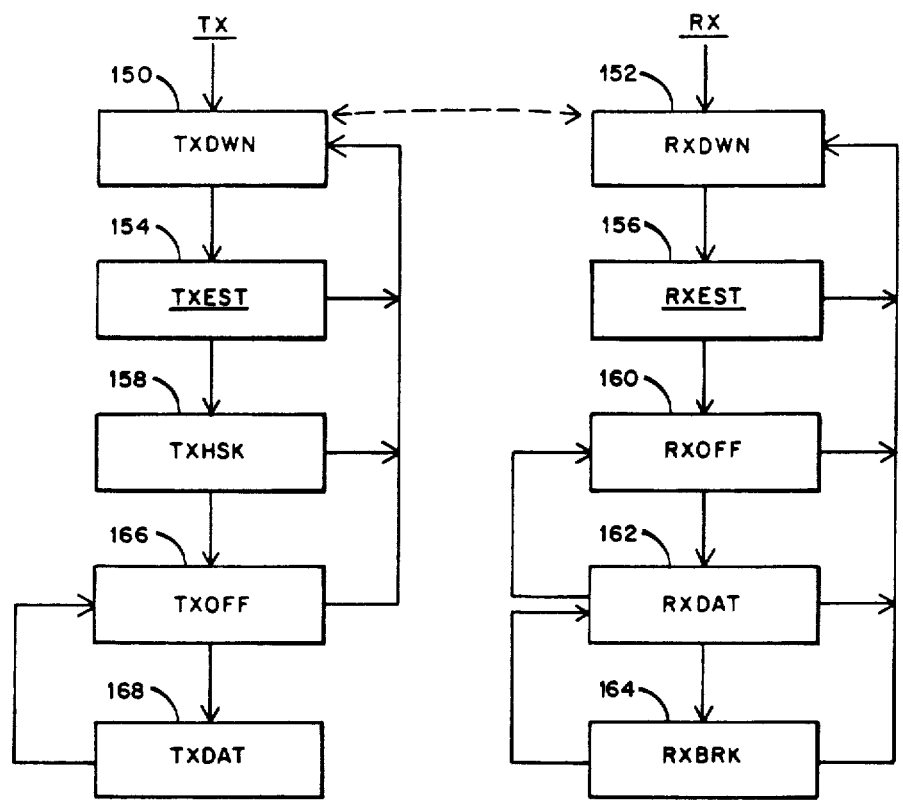
FIG. 2 is a main block diagram of firmware states.
Figure 11:
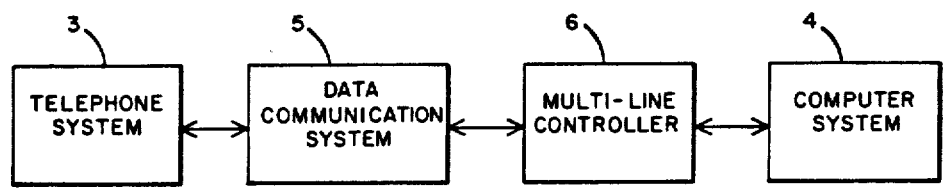
FIG. 11 is a very general block diagram illustrating the data communication system as it interrelates to the telephone communication system and computer system.

Reference is now made to FIG. 1 which is a block diagram of one embodiment of hardware that may be employed in accordance with the firmware state machine concepts of the present invention. Reference is also made to FIG. 2 which is a very general block diagram of broadly-defined firmware states for both transmit and receive sides of operation. Refer also to the block diagram of FIG. 11 for a very general overview of the system for controlling data transfer between a telephone system 3 and a computer system 4. Interconnected therebetween is a data communication system 5 and a multi-line controller 6. The details of the multi-line controller 6 are not described herein. The concepts of the present invention relate primarily to the data communication system 5 for controlling the data transfer between the telephone communication system 3 and computer system 4. The telephone system 3 may include a number of terminal devices coupled by telephone lines such as PBX lines. The computer system 4 may be of the Honeywell DPS-6 type.

Before delving into the firmware state apparatus concepts, reference is made to the hardware block diagram of FIG. 1. FIG. 1 illustrates a digital asynchronous multiplex adapter system that provides for the transfer of data, control information and signalling information as required to support operations between a number of terminal devices coupled by a telephone line to the left in the diagram, and a computer system and associated controller that would be coupled from the right of the diagram of FIG. 1. More particularly, the terminal devices may be connected via AT&T terminal adapters, an AT&T system 85 PBX and the PBX Digital Multiplex Interface trunk, and applications running in a computer system such as a Honeywell DPS-6 supported via the asynchronous multiplex adapter system and a multiline communication controller. For the sake of simplicity herein, the terminal devices, and multiline communication controller, are not described in detail herein.

The microprocessors are illustrated in FIG. 1 as a receive microprocessor 10 and a transmit microprocessor 12. Both of these microprocessors may be of conventional type 68008. Associated with the receive microprocessor 10 is the receive data bus 14 and also the receive address bus 16. Associated with the transmit microprocessor 12 is the transmit data bus 18 and the transmit address bus 20.

FIG. 1 also illustrates the XRAM 22 having associated data bus 24 and address bus 26. In the block diagram of FIG. 1, the IRAM 28 is disposed adjacent to the XRAM 22. The IRAM 28 similarly has associated therewith a data bus 30 and an address bus 32. The databus 30 couples by way of transceiver 31 to the output data bus 33 which is adapted to couple to a multiline communication controller, not illustrated herein. Similarly, the address bus 32 is adapted to couple by way of transceiver 35 to the address bus 36. The address bus 36 is adapted to likewise couple to a multiline communication controller, not illustrated herein.

Herein reference is made to the use of tranceivers used in association with address and data busses, such as the aforementioned transceiver 35. However, in some instances these devices may be substituted for by tri-statable buffers.

As indicated previously, the system illustrated in the block diagram of FIG. 1 is adapted to connect to up to 16 terminal devices at any one time via a digital multiplex interface trunk. In this connection to the left in the block diagram of FIG. 1 note the coupling transformer X1 for the transmission of signals from the transmitter 40. Also note the coupling transformer X2 for the receipt of signals by the receiver 42. Coupled between the transmitter and receiver is a framer 41. The transmitter 40, receiver 42 and framer 41 are all standard AT&T circuits. The transmitter is of type 606 HM. The framer circuit is of type 229GB. The receiver is of type 630AG.

The block diagram of FIG. 1 also shows communication between both the transmitter 40 and the receiver 42 to the data circuits 44. The circuits 44 are commonly referred to as DUSCC chips. Each of these is a dual universal serial communication controller (DUSCC). These circuit chips are conventional and are identified by Signetics part number 68562. As illustrated in FIG. 1 there are eight of these data circuits 44. Each circuit 44 comprises two communication channel processors. Also note in FIG. 1 the address bus 46. With each of the data circuits 44 being comprised of two communications channels, there are a total of 16 lines that couple to the DUSCC data bus 48.

With regard to communication at the data circuits 44, it is also noted in FIG. 1 that there is provided a multiplexer 50 that provides communication, as to be described in further detail hereinafter, between the data circuits 44 and the transmitter 40. Also illustrated in the block diagram of FIG. 1 is a receive clock commutator 52 that controls the transfer of data from the data circuits 44 to the receiver 42. This operation is also described in further detail hereinafter.

Bascially, the outputs from the data circuits 44 are multiplexed by the multiplexer 50 and are coupled to the transmitter 40 in a time division multiplexed manner. The receiver inputs of each of the data circuits 44 are connected in common as illustrated in the diagram and there is provided a clocking scheme (see commutator 52) that delivers 8 clock pulses to each of the data circuits 44 in sequence. The clock signals from the receiver 42 are de-multiplexed and decoded and delivered to each of the 16 channels of the data circuits 44 on a time division multiplex basis.

As indicated previously, the data circuits 44 have a common address bus 46. This address bus is comprised of 6 address lines which may be driven semi-directly from the transmit microprocessor 12. Note in FIG. 1 that the transmit address bus 20 couples by way of buffer 47 to the data circuits address bus 46.

As indicated previously, the transmit microprocessor 12 is of type 68008. The transmit microprocessor 12 at its address bus provides for substantially direct addressing of the data circuits 44. Also note that the address bus 46 for the data circuts 44 may be controlled from direct memory access (DMA) control logic. In this regard note the coupling at buffer 45 in FIG. 1. This particular DMA address control is used to access the data circuits 44 for receiving data. The transmit microprocessor 12 on the other hand accesses the same bus 46 directly for transmitting data and also for set-up.

The data circuits 44 all have a common data bus 48 which is referred to as the DUSCC data bus. It is noted that this data bus 48 is separated from the receive fifo data bus 54 by a transceiver 55. Similarly, the data circuits 44 data bus 48 is separated from the transmit data bus 18 by a further transceiver 56. With regard to access to the address bus 46, conventional control logic is provided to assure that the transmit microprocessor 12 is not on the bus 46 at the same time that the DMA controller is.

As indicated previously, the DUSCC data bus 48 couples by way of transceiver 55 to the receive fifo data bus 54. Coupled from the bus 54 is a large capacity fifo illustrated in the block diagram of FIG. 1 in two parts including a receive data fifo 60A and a receive status fifo 60B. Hereinafter this will be referred to from time to time as fifo 60. The receive data fifo 60A couples to the fifo data bus 54 by way of the transceiver 62. Similarly, the receive status fifo 60B couples to the fifo data bus 54 by way of the transceiver 63. Also illustrated in FIG. 1 is the receive data DMA controller 64 which provides control to the fifo 60. Also note in FIG. 1 the line 65 coupling from the DUSCC data bus 48 to the controller 64.

In two bus cycles data is read out of the data circuits 44 via the transceivers 55, 62 and 63, including both status and data, storing this information in the fifo under control of the receive data DMA controller 64. This data and status information is stored in the fifo 60 and is accessed by the receive microprocessor 10. In this regard, note that the data bus 14 associated with the receive microprocessor 10 is coupled to the fifo data bus 54 by way of the transceiver 66. The receive microprocessor 10 accesses the fifo 60 whenever it has a chance and it does so by way of a polling scheme. More particularly, the receive microprocessor 10 interrogates the fifo 60 and checks the status indication therein to find out if anything is stored in the data section of the fifo 60. If it is, it reads the status and data information into the XRAM 22 where it is stored. It actually stores the data in the XRAM 22, checks the status and takes appropriate action if necessary. In this connection note that the communication from the receive microprocessor 10 is by way of the receive data bus 14 and the transceiver 68 to the X-data bus 24. There is also a further transceiver 69 that intercouples the X-data bus 24 with the I-data bus 30.

The receive data bus 14 has coupled thereto, in addition to the receive microprocessor 10, the firmware prom 70. This prom 70 is preferably a 16K by 8 bit prom or eprom.

As indicated previously, the X-data bus 24 is coupled to the R-data bus 14 by transceiver 68. Similarly, there is also a further transceiver 71 that intercouples the X-data bus 24 to the transmit data bus 18. Control logic circuitry assures that the receive microprocessor 10 and transmit microprocessor 12 are never both on the X-data bus 24 at the same time.

As indicated previously, the X-data bus 24 couples to the I-data bus by way of the transceiver 69. The I-data bus 30 in turn couples to the controller output bus 33 by way of the transceiver 31. Similarly, the I-address bus 32 intercouples between the X-address bus 26 and the controller address bus 36. The intercoupling is provided by means of transceivers 29 and 35. The microprocessor that has control of the X-bus, at that instant in time, is the only one that can access the I-bus. In this regard, X-bus contention logic is used for controlling access to the X-bus. The X-bus contention logic is illustrated in FIG. 1 at 73. It is furthermore to be noted that either the receive microprocessor 10 or the transmit microprocessor 12 can access the X-data bus 24.

In addition to the receive data bus 14 associated with the receive microprocessor 10, there is also a receive address bus 16 associated with the receive microprocessor 10. The receive address bus 16 also intercouples to the firmware prom 70. A decode of the address bus 16 also occurs and in this connection refer in FIG. 1 to the receive address decoder 76. The decoder 76 decodes higher order bits of the address bus 16.

The decoder 76 has illustrated at the output thereof three separate lines that indicate decodes for communication with different system components. For example, one decode at output line 77 indicates data access to the receive microprocessor prom 70. Another decode at line 78 indicates data access to the XRAM 22. Still a further decode at line 79 indicates data transfer from the fifo 60.

In the block diagram of FIG. 1 also refer to the transmit address bus 20. It is noted that there is also a transmit address decoder 80 coupled from this address bus. This decoder 80 also has three output lines coupled therefrom. A first decode at line 81 indicates data transfer from the transmit microprocessor prom 84. In this regard, it is noted that the firmware prom 84 is a 16K by 8 bit prom that couples to both the transmit data bus 18 and the transmit address bus 20. The address decoder 80 has a second decode output at line 82 that decodes access to the XRAM 22. There is also a third decode at line 83 from the transmit address decoder 80 indicating data transfer to the DUSCC bus 48.

Because the transmit microprocessor 12 cannot access the fifo 60, the same address space is used for the data circuits 44 on the transmit microprocessor Similarly, the receive microprocessor 10 cannot physically address the data circuits 44 as neither the address nor data busses couple directly thereto. Therefore, that address space is used for the receive data fifo 60.

Either of the microprocessors 10 or 12 may access an address space that points to the IRAM 28. In the disclosed embodiment this is an address base between 16,000 hexadecimal and 18,000 hexadecimal. Access to the IRAM 28 is via the X-bus (data bus 24 and address bus 26).

Also illustrated in FIG. 1, and referred to hereinbefore, is the X-bus contention logic 73. The inputs thereto are two separate signals indicating that the receive microprocessor wants to go to the XRAM 22 or the transmit microprocessor wants to go to the XRAM 22. These signals are coupled to the logic 73 on lines 85 and 86. Similarly, there are outputs on lines 87 and 88 which are identified in FIG. 1 as respective signals R2XBUS and T2XBUS. The bus contention logic 73 basically permits one but not both processors to access the XRAM. Again, the respective signals are the signals R2XBUS at line 87 and T2XBUS at line 88. It is noted that these signals couple respectively to the address multiplexers 90 and 92 as enable inputs thereto. The XBUS contention logic 73 is considered to be of well-known conventional design.

Reference is also made to further circuit details of portions of the block diagram of FIG. 1 as set forth in co-pending application listed above.

Presuming that one of the microprocessors 10 and 12 has in fact asked for and received the X-bus, the addresses from the microprocessor couple by way of either the receive address bus 16 or the transmit address bus 20 to the respective multiplexers 90 and 92 illustrated in FIG. 1. The multiplexer 90 receives the receive microprocessor addresses and the multiplexer 92 receives the transmit microprocessor addresses. These addresses are coupled through the multiplexers depending upon which one was enabled by the signals coupled to the enable inputs thereof. These are the respective signals R2XBUS and T2XBUS. The output of the multiplexers couples in common to the X-address bus 26.

With further reference to FIG. 1, it is noted that further decoding occurs off of the X-address bus 26. In this connection note the address line 96 coupling to the X-address bus address decoder 97. A further line 98 along with a line 99 from the decoder 97 couples to a further decoder 100. The addresses coupled to the decoders 97 and 100 are higher order bits of the address bus 26. These are decoded in the presence of an X-bus cycle (XB5CYC) to determine whether signals are to be coupled to the XRAM, IRAM, SRAM, or hardware strobes. In FIG. 1 these different signals are depicted at the output of the X-bus address decoder 97. FIG. 1 also illustrates to the right of each of these signals the particular addresses involved The hardware strobes are at an address of 12XXX hex, XRAM access is decoded at an address of 10XXX hex, the S-bus access is at address 14XXX hex, and the I-bus address is at 16XXX hex.

In FIG. 1 reference has been made to the X-bus address decoder 97. This is the same decoder as illustrated in FIG. 2 of the aforementioned application Ser. No. 032,902 as decoder 97 and there is shown therein the four output signals. On the first line is the signal XRAMEN which is the XRAM enable signal. On the next line is the signal XREGEN which is the hardware strobe register enable. The next line is the signal SBUSAC which is the SRAM access signal. Finally, on the last line is the signal IBUSAC which is the IRAM access signal. With regard to the reference to the SRAM, it is noted that this device has not been described herein as it is not believed to be necessary in the explanation of the concepts of the present invention.

In FIG. 1 the decoder 100 may actually be comprised of a pair of decoders each of type 74LS138. These decoders provide hardware decoder strobes A first decoder may provide read only strobes. The other decoder may provide write only strobes and in particular there are two signals that are of interest coupled therefrom. These are the signals for clocking the respective receive and transmit channel numbers. These signals may be referred to as signals POPCRN— and POPTCN— corresponding to physical hardware addresses of 12,004 and 12,005 hex as illustrated in FIG. 1. The address 12,004 is the signal POPRCN— (and POP the receive channel number) which changes the receive channel number. The address 12,005 is the signal POPTCN— (POP the transmit microprocessor channel number).

Figure 6:
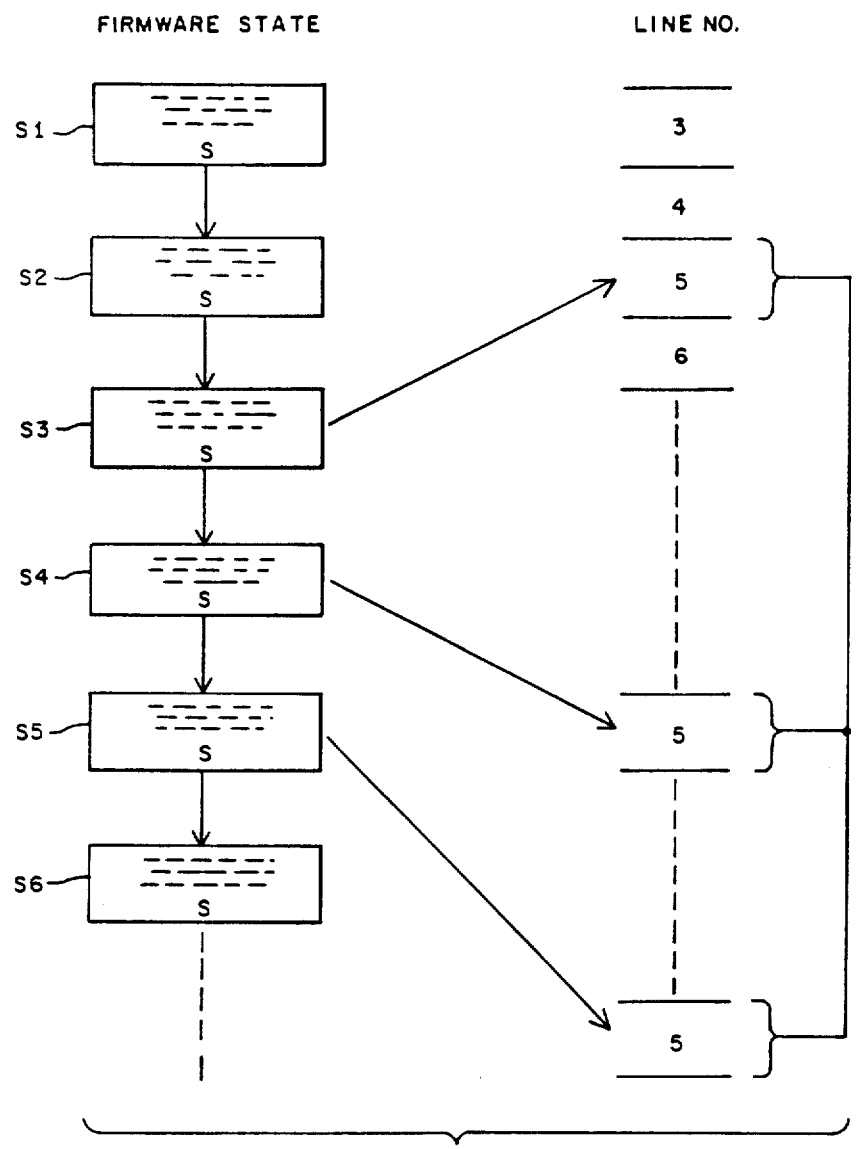
FIG. 6 is a further firmware state diagram illustrating the suspend of function as it relates to continued work on a particular line.

Reference is made once again to the block diagram of FIG. 1 for the portion of the system that uniquely controls transmit and receive channel numbers. In this connection refer to the control prom 104. The capacity of the prom 104 is to be at least 1K by 4 bit. Also illustrated in FIG. 1 is the receive channel number register 106 and the transmit channel number register 108. It is noted that each of these registers 106 and 108 is a four bit register. The four bits identified up to 16 separate channels or tables. Thus, there are four bits coupled by way of line 107 from the register 106 to the input of the prom 104. Similarly, there are four bits coupled on line 109 from the register 108 also to the input of the prom 104. The outputs of the registers 106 and 108 at the respective lines 111 and 112 couple to the receive and transmit microprocessor X-bus multiplexers 90 and 92. The multiplexers provide an alternative way of addressing the X-bus 26. As indicated in FIG. 1 at one side of the multiplexers the addresses from the registers 106 and 108 are coupled along with other addresses either from the receive address bus 16 or from the transmit address bus 20. The four bits from these registers change some of the middle weight address bits. They do so in such a way that, when addressing the X-bus, they break the X-bus addresses into 256 byte chunks. There are 8 address bits below these four and then there are higher order bits that are used to actually decode the X-address Let it be assumed that the transmit microprocessor 12 is to access the paged XRAM 22 at channel number 4. Access is to be provided to the line table for channel number 4. In this regard refer to the schematic diagram of FIG. 6 of the aforementioned application Ser. No. 032,902 which shows the XRAM 22 separated into multiple line tables. There are actually 16 line tables. However, for simplicity in FIG. 6 only line tables 0-7 are illustrated. FIG. 6 of application Ser. No. 032,902 also illustrates the associated addresses to the left of the line table designations. The physical address for line table number 4 is 10,400. The lower order two digits are the actual location within the line table for 256 locations. The next digit up from that is the four digit line number so the address would be 104 for the line number 4.

With regard to the separate line tables, refer now to the more detailed diagram of FIG. 4 which shows one of the line tables, namely the line table number 1 with an address of 10,100. It is noted that this line table is comprised of 256 bytes designated in a tabular manner by locations 0–9 and A–F. Each of these bytes is comprised of 8 bits. In order for the XRAM 22 to store all of this line table data there is required a capacity of 256 locations times the 16 line tables or in other words a capacity of 4K by 8 bits. In the particular implementation illustrated in FIG. 1 the capacity employed is actually twice that amount, the remainder being used in an unpaged manner.

As indicated previously, for channel four the address is 10,4XX. If it were the same location but on channel number 5 then the address is 10,5XX. Similarly, if the system is going to page IRAM, which also is driven off of the same bus, it is paged in the same manner by the same mechanism. One would go to address 16,4XX for something on line 4 or 16,5XX for something on line 5. The same numbers are valid for the receive microprocessor and that is how the receive and transmit microprocessors can pass information between each other very easily.

Now, if either of the microprocessors 10 or 12 wish to address the XRAM 22 using this paging scheme, then, instead of addressing by line 4, address XX, (104XX) the addressing occurs via a scheme using a single higher order bit. The address instead is 50,OXX. This pulls in the receive or transmit line number, depending upon which microprocessor is under control. Depending upon whether in transmit or receive modes the address is multiplexed into the middle bits of that byte in the same physical address position. With this technique the receive microprocessor and the transmit microprocessor need never know which line is presently being accessed in order to access the appropriate line table. The processor simply addresses 50,OXX and gets its line number, forced by hardware to the correct physical address for whatever byte it happens to be interested in This is the way that this paging algorithm works.

Next, is a discussion of the actual hardware and firmware for changing the line numbers either on the receive microprocessor 10 or the transmit microprocessor 12. The following is a discussion as to how the logic operates and the manner in which it is implemented in firmware. The channel number selection, for selecting specific line tables of the XRAM 22 involves the prom 104 illustrated in FIG. 1 along with the registers 106 and 108 and the multiplexers 90 and 92. The prom 104 may be a circuit type 82S185. The channel registers 106 and 108 may be of circuit type 74S175. The multiplexers 90 and 92 may be of circuit type 74LS257. It is noted that both of the multiplexers have enable inputs that require a negative logic input for enable. Thus, the paging multiplexer for receive is enabled by the signal R2XBUS— while the paging multiplexer for the transmit mode is enabled by the signal R2XBUS+. In essence, when in the receive mode the signal R2XBUS+ is positive and thus the signal R2XBUS— is negative thus enabling only the multiplexer 90 driving the receive microprocessor addresses to the XBOS.

The channel selector prom 104 may be a 1K or 2K by 4 bit prom. The prom 104 receives 9 address bits. Four of these bits are from the receive line register and 4 bits are from the transmit line register. One bit determines whether the transmit or receive microprocess is changing table number. This is the signal XADR19+ which is coupled to the middle input of the prom 104.

The four outputs from the channel selector prom 104 couple to the two registers 106 and 108. These are the respective receive channel number register and the transmit channel number register Both of these registers are four bit registers.

Multiplexers 90 and 92 drive either the straight-through microprocessor addresses or the microprocessor addresses with the line number substituted for the middle bits. Also, the transmit multiplexer drives the transmit straight-through microprocessor addresses or the microprocessor with the line number substituted for the middle bits.

As previously indicated, the X-bus and the XRAM can be addressed either in a direct mode or in a line page mode by either microprocessor. In this regard, in FIG. 1 it is noted that, for example, the receive address bus 16 couples directly without any bit substitutions to one side of the multiplexer 90. Similarly, the transmit address bus 20 also couples directly to one side of the multiplexer 92. This alternate form of addressing of the X-address bus 26 occurs because there are some instances in which control is in a non-line number context such as in an interrupt mode when one has to handle something for a line, it is not known what line it is, and in fact it may be a line other than the line being operated upon.

As indicated previously, the channel selector prom 104 has four bits coupled to it from the receive line register 106. In this connection note the return line 107 in FIG. 1. Also, there are four bits coupled to the prom 104 from the transmit line register 108. Note the return line 109 in FIG. 1. There are also two other bits coupled to the prom 104 for a total of 10 bits thus effectively making it a 1K prom although in fact it has been implemented by a 2K prom. Of the 2 other bits, one is used for a QLT mode which relates to quality logic testing. This is not described in any detail herein because it is not believed to be directly pertinent to the present invention. The other signal to the channel selector prom is the signal XADR19+00. The address XADR19 is the lowest order bit of the X-address bus.

With respect to the block diagram of FIG. 1, refer again to the decoder 97 and the decoder 100. With regard to the decoder 97 the lowest line coupling therefrom has been referred to as the hardware strobes, address 12,XXX. That output couples by way of line 99 to the decoder 100 for providing hardware decoded strobes. There is a write strobe and there are two leads shown drawn out of the decoder 100. These are the signals POPRCN— and POPTCN— as described previously. The receive channel number has a physical address of 12,004 while the transmit channel number has a physical address of 12,005. If either microprocessor does a physical write to address 12,004, the signal POPRCN— goes low and then high. The time period of that signal is approximately two bus cycles or 250 nanoseconds. The prom 104 cycles in approximately 85 nanoseconds and therefore the outputs are strobed at the end.

From the decoder 100 below the receive channel number output signal, there is the transmit channel number signal which is an address of 12,005. If either microprocessor does a write to a physical address of 12,005, that line will transition low and then go back high again after approximately about 2 cycles or 250 nanoseconds.

With reference to FIG. 1 and in particular the receive and transmit channel registers 106 and 108, it is noted that the signal POPRCN—00 clocks to register 106 while the signal POPTCN—00 clocks to register 108. These are the signals taken from the output of the decoder 100 in FIG. 1. It is to be noted that either microprocessor 10 or 12 can clock the other or its own line register. However, one must therefore strictly impose the discipline that only the receive microprocessor will ever do a write to physical address 12,004 and only the transmit microprocessor will ever do a write to address 12,005. Once that discipline is established, the least significant address bit is always a "1" when the transmit microprocessor is trying to change its channel number and it is always a "0" when the receive microprocessor is trying to change its channel number. Thus, with one low order bit, namely signal XADR19+00, brought to the prom 104, the prom can then determine which of the two channel numbers is to be changed.

Reference is now made to the manner in which the prom 104 is programmed so as to determine the manner in which the registers 106 and 108 are changed. Only one microprocessor can change a channel number at a time because only one microprocessor can have access to the X-bus during one bus cycle. The two registers 106 and 108 that are being controlled have separate clocks so that the microprocessors can change their channels independently. Furthermore, as indicated previously, the clocking of these registers is caused by hardware decodes of memory addresses that differ by only one address bit. Then, by convention, only the receive microprocessor would access its strobe and only the transmit microprocessor its strobe. The determination of which would be the next channel for either processor is made by the prom 104. The prom has knowledge of the present channel for each microprocessor along with which one of the microprocessors wishes to change its channel number.

The prom 104 is programmed with the following considerations being made. The receive microprocessor 10 regresses through channel numbers in a reverse direction. Of the hex identified channels 0-9 and A-P, the receive microprocessor services channel F and then channels E, D, C, B, A, 9, 8, 7, 6, 5, 4, 3, 2, 1, 0, F. The transmit microprocessor progresses in the normal forward direction as follows 0, 1, 2, 3, 4, 5, 6, 7, 8, 9, A, B, C, D, E, F, 0. It has been found that by using this progressive-regressive scheme that all channels are accessed with none locked out. Any skipped channel is accessed in a subsequent cycle.

The foregoing sequence assumes that there is never a conflict. However, with this scheme there is apt to be a conflict once around the sequence. This is handled by the prom 104.

The transmit and receive microprocessor cooperate to handle the combined task of sending and receiving data over multiple (in the disclosed embodiment 16) data channels. When one microprocessor has its operating process gain access to any specific line table by suspending, it is guaranteed to have virtually exclusive accesss to that line table and all information in it. The only exceptions are those pieces of information which are handled by interrupts on either microprocessor. These exceptions, not directed to the invention, are not described in any detail herein. This assumption means that one microprocessor does not have to check to see if the other microprocessor has access, since by hardware/firmware definition, the other microprocessor cannot be using or changing that information at the same time.

When there is a conflict, if the transmit microprocessor is trying to go from "0" to "1" at the same time that the receive microprocessor is at line "1", since it is a transmit microprocessor the address being strobed is the address 12,005. The least significant bit of this address is a "1", therefore, the signal XADR19 into the prom will be a "1". At that point in time, at the instant that the signal goes to a "1", the prom switches its addresses. It will see that the transmit microprocessor is at channel 0 trying to go to channel 1. However, if the receive microprocessor is already at channel 1, the number coded into that prom at that location will be a 2 so that the transmit microprocessor will simply skip channel 1 and go instead to channel 2. When the clock goes high, channel 2 address is clocked into the transmit channel number.

It is noted that the prom 104 is continuously monitoring the channel numbers. However, the only time that one cares about what is outputted from the prom 104 is when in fact either the signal POPRCN— goes low or the signal POPTCN— goes low.

Next in order is a discussion of the firmware associated with the concepts of the invention. In this regard, it is noted that the present system operates on the basis of task suspensions in communicating between microprocessors rather than with the use of interrupts. In this regard, when one of the microprocessors gains control of the line table by suspending onto it, it continues the process already begun on behalf of that channel by starting at the "suspend point" indicated in the line table and continuing to process that piece of work until it again suspends off of that line table onto another. During this period of time, the microprocessor has exclusive use of that line table, which it gives up when it suspends off of that line table.

This concept is carried out in accordance with the previously mentioned scheme of having one of the microprocessors work on tasks for channels in ascending order while the other counts down. The suspend concepts involve saving the suspend address for use at resumption. This is followed by the indexing of the appropriate channel number register. Next, the resume address is picked up and branched to.

Figure 7:
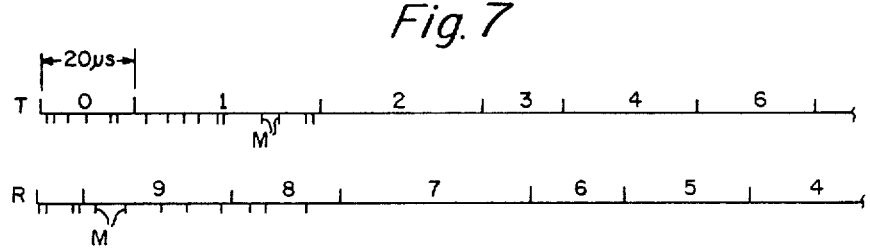
FIG. 7 illustrates the sequence of both transmit and receive microprocessors illustrating the sequencing of channel numbers.
Figure 8:
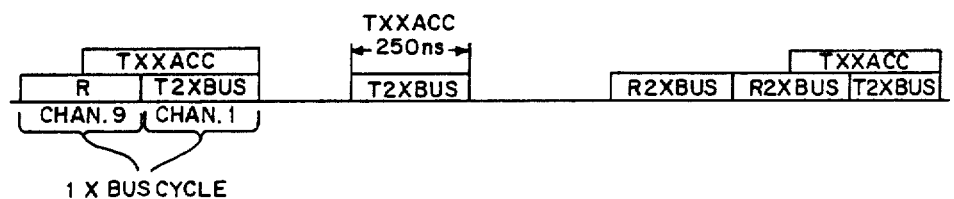
FIG. 8 is a timing diagram illustrating the interleaving of cycles for the transmit and receive microprocessors.
Figure 9:
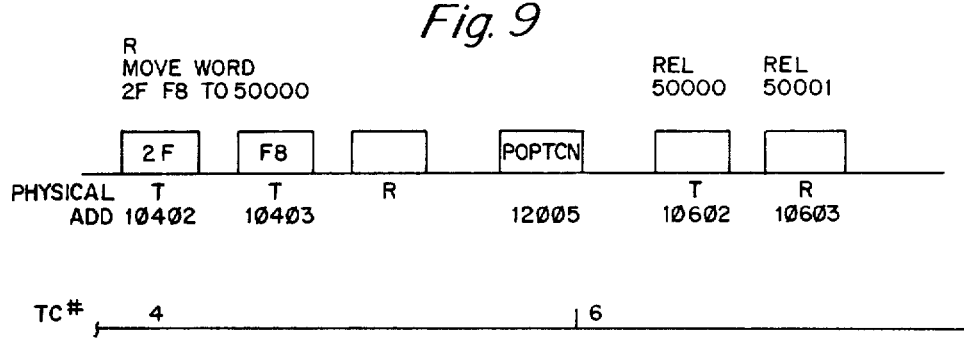
FIG. 9 is also a timing diagram illustrating the suspend function in a channel number conflict situation.

Reference is now made to further timing diagrams helpful in illustrating the control concepts of the present invention as applied to dual microprocessors for transmit and receive. functions. Briefly, FIG. 7 illustrates the sequence of both transmit and receive microprocessors illustrating the sequencing of channel numbers. FIG. 8 is a timing diagram illustrating the interleaving of cycles for the transmit and receive microprocessors. FIG. 9 is also a timing diagram illustrating the suspend function in a channel number conflict situation.

The timing diagram of FIG. 7 illustrates the fact that each of the two microprocessors operates on behalf of one channel at a time. FIG. 7 also illustrates that each microprocessor is precluded from operating on behalf of any channel if the other microprocessor is already working on "that" channel. In particular, in FIG. 7, note the point where the transmit microprocessor goes from channel 4 to channel 6. This is an example of a sensed conflict because the receive microprocessor was already working on channel 5 at the time that the transmit microprocessor suspends. Accordingly, from the hardware described herein, the transmit microprocessor is instead sent to channel 6 thereby avoiding having both microprocessors accessing the same line table at the same time.

Incidentally, in FIG. 7 the marks M generally indicate X bus cycles. Typically, the duration of a channel is several microseconds. Note in FIG. 7 channel 0 having a duration of, for example, 20 microseconds.

FIG. 8 is also a timing diagram representative of a small segment of the diagram of FIG. 7 in the area of the transmit channel 1 and the receive channel 9. FIG. 8 illustrates the interleaving of cycles for the transmit and receive microprocessors on the X bus, showing that only one microprocessor has access during one bus cycle. If there is a contention conflict at this level, the losing microprocessor is stalled until the other microprocessor ends that bus cycle. Because the signals POPTCN and POPRCN are signals that are decoded off the X bus, they cannot occur simultaneously.

In FIG. 8 note that the receive microprocessor has access first accessing the line table corresponding to channel 9. There is then a request for access by the transmit microprocessor and during the next bus cycle, the transmit microprocessor has access and this access is to the line table corresponding to channel 1. It is noted in FIG. 8 that the period of each bus cycle may be on the order of 250 nanoseconds.

FIG. 9 is also a timing diagram illustrating the transmit microprocessor suspending from channel 4 to channel 6. In FIG. 9, note that there are initially two bus cycles relating to the transmit microprocessor for establishing a new suspend point, the place to pick up at when one returns to this line table. Also note the signal POPTCN at physical address 12,005 which has the effect of clocking the transmit register. In this particular example, because the receiver is already on channel 5, the logic involving the PROM 104 thus clocks from channel 4 to channel 6 for the transmit register.

In FIG. 9 the signal TC# represents the contents of the transmit channel or line number register. The signal RC# represents the contents of the receive channel or line number register.

It is also to be noted in connection with FIG. 9 that although channel 5 has been skipped as far as the transmit microprocessor is concerned, this channel will be picked up at a later time in the sequencing. Thus, either of the microprocessors is not precluded from accessing any of the line tables, merely from accessing the same line table as the other microprocessor at the same time.

As indicated previously, both the receive microprocessor and the transmit microprocessor may be of type 68008. These microprocessors typically have 8 address registers and 8 data registers. The address registers are typically referred to as registers A0–A7. In each microprocessor, an address register is dedicated to point to the appropriate suspend address in the line table. Register A0 is adapted to point at physical address 50,000 which is the location 0 at the beginning of the line table. The address register A4 points to the physical address 50,002. This points to the receive microprocessor suspend address in the line table. Again, refer to FIG. 4. The address register A4 is always left pointing to the physical address 50,002 to make the readout more easily. The readout occurs in two byte quantities.

In summary, FIG. 1 is a hardware diagram illustrating a system in which the firware state concepts of the present invention may be embodied. However, it is understood that these concepts may also be practiced in other types of systems including fewer or greater numbers of processors. The firmware concepts of the present invention are instrumental in enabling proper transfer of data in an optimized manner particularly when there is data transfer occurring on a random basis on multiple data lines. Within the firmware state concepts, the suspend feature, which has been described somewhat hereinbefore, is a means by which the systems attention is directed from line to line. As indicated previously, an aspect of the suspend feature is that there is no context that has to be saved at any time when converting from one task to another. In the preferred embodiment, all that is stored off is the program counter position so that the system knows where to pick-up and resume processing on a particular line at an appropriate time. The suspend feature, from a hardware standpoint, makes use of the paged memory in which there is a segment of memory allocated to each line.

In accordance with the firmware state concepts of the present invention, a particular firmware state at any particular time is defined, for processing purposes, simply as the program counter position where that state will subsequently start executing code when again accessed With regard to the firmware state concepts of the invention, reference may now be made to FIG. 6 which is a block diagram showing, on the left a series of firmware states S1-S6. Interconnecting lines show the sequencing from firmware state to firmware state. On the right, in the diagram of FIG. 6 is a representation of the data line numbers, The arrows interconnecting the left and right of the diagram of FIG. 6 highlight line number 5. This diagram clearly illustrates that processing on line number 5 occurs in separate segments each time that line number 5 obtains access. A great number of the program steps in these various states represent waiting for some event to occur. There are typically three major waiting events. On the receive side, the receipt of data is awaited. There is a wait for an acknowledgement that the data has been passed to the computer Thirdly, there are waits that occur for certain times to elapse. The computer referred to is coupled by a multiline controller connected to the address and data busses 33 and 36, respectively, in FIG. 1. As indicated previously, the computer may be a Honeywell DPS6.

Now, returning to the diagram of FIG. 6, it is noted that initially, work is being accomplished for line 3, for example, and next, to line 4, and so forth. Each of the lines is operating on different tasks and is accessed only on a one line at a time basis. As indicated previously, a substantial amount of time is actually devoted to simply waiting; for example waiting may occur for the telephone to "ring". FIG. 6 illustrates the interleaving of all of these states and the arrows indicate that when these states are pieced together, say for line 5, there is then a complete sequence of states.

FIG. 6 also illustrates in each firmware state a "suspend" which is illustrated at the end of the state by the s. In actuality, depending upon the particular state, there may be a series of suspensions that occur within a state and before the state is completed. For example, when in the firmware state, S3, for line 5, after certain processing of work, a suspend may occur. The suspend address for that state is saved off and the next time that line 5 has access, processing will start in that state When a test indicates that the state is completed then a new suspend address may be set corresponding to the next state. When the processor now returns to this line again, then the address that is detected will be the suspend address for the next state.

Reference is now made to the overall firmware state block diagram of FIG. 2 illustrating the transmit states on the left and the receive states on the right. On each side the states illustrate the progress of the sequence. Each of these individual states are implemented by a number of smaller substates described hereinafter in connection with FIGS. 3A-3H.

On each side in FIG. 2 there is a "down" or "tear down" state. This is simply a state that causes the telephone to be hung-up and the connection to be dropped. These states are illustrated in FIG. 2 as the state TXDWN (state 150) and the state RXDWN (state 152). These states are responsible for hanging up the telephone, disconnecting the connection to the computer, clearing out all status of the preceeding call and reinitializing the system so as to be prepared to take another call on that same line.

The next state illustrated in FIG. 2 is the state TXEST (state 154) and the state RXEST (state 156). These are referred to as "establish" states. This allows one to establish a new call on that same line. Typically, the "establish" state is a waiting state. In the "establish" state, one is simply "waiting for the telephone to ring". When either side attempts to initiate a call, it checks that the correct conditions exist and that the particular line is one that can either accept or initiate calls, and sets up certain conditions that have to be in place to proceed further. On the transmit side, after the "establish" state, the transmitter then moves into a handshake state referred to as the state TXHSK (state 158). Similarly, on the receiver side the receiver moves to the state RXOFF (state 160).

On the receiver side, the state RXOFF draws the attention of the receiver to the communication/telephone line but it is a state in which the computer does not desire data to be delivered. In the state RXOFF any data that comes in is discarded but the periodic processing of up-date messages is continuously performed.

The companion to the state RXOFF, as illustrated in FIG. 2, is the state RXDAT (state 162). In that state, data is coming in and is actually delivered to the computer as the data is received. The states RXOFF and RXDAT are similar except that in one state (RXOFF) data from the communication line is discarded and in the other state (RXDAT) it is passed on to the computer which connects to the data and address busses 33 and 36 via a multi-line controller, not illustrated herein.

In the state RXOFF there are some special steps that are carried out to synchronize the receipt of data at the computer.

The final state on the receive side is the state RXBRK (state 164). This is the state that is entered when, via up-date messages, a "break" signal is received from the communications line. The "break" is a concept where an override signal may be sent, drawing attention to the receiver without utilizing the data facilities, per se. The state RXBRK is similar to the state RXOFF. When one enters the state RXBRK a request is posted to the computer to inform of the "break" condition. Then one proceeds to discard data until the up-date message, which indicates an end-of-break, is received One then returns to the state RXDAT.

On the transmit side in FIG. 2, when the line is first established, as the phone has rung and has been answered, then there are a number of handshaking messages that are exchanged between the controller and the telephone equipment at the far end of the line. These handshake messages are passed to insure that the two devices can in fact communicate one to the other and to negotiate and decide upon a data signalling rate that will be used to the terminal and other aspects of the terminal connection itself. While the transmitter is in the "handshake" mode, the receiver is in the "off" state and while it is in the "off" state it is discarding data. The computer, such as a Honeywell DPS6 does not want any data yet and so it recovers the handshake messages from the line and simply informs the transmit microprocessor 12 of the existence of these messages. This allows it to process them and the transmitter then continues to tell the firmware operating in the receiver "off" state when to go ahead and retrieve the next message from the line. If handshaking fails, then the system returns to the "down" state. If for some reason it is found that there are incompatible data rates or otherwise incompatible devices, the connection is torn down.

When the handshake is successful on the transmit side then the system proceeds to the state TXOFF. As illustrated in FIG. 2 there is both a state TXOFF (state 166) and a state TXDAT (state 168). These states correspond to the DPS6 computer desiring to either transmit or not transmit data. When it wants to transmit data it turns its transmitter on and the system goes into the state TXDAT. When it has no data to transmit and turns its transmitter off then the system enters the state TXOFF. In the state TXOFF basically the only thing that is tested for is whether or not the transmitter is turned off. When there is no data to be sent then further tests are made to find out if the DPS6 computer wishes to drop the connection or in some other way change the nature of the connection and so the processing workload is shared between the states TXDAT and TXOFF. From a time standpoint most of the time the transmitter is in the state TXOFF.

Figure 3A:
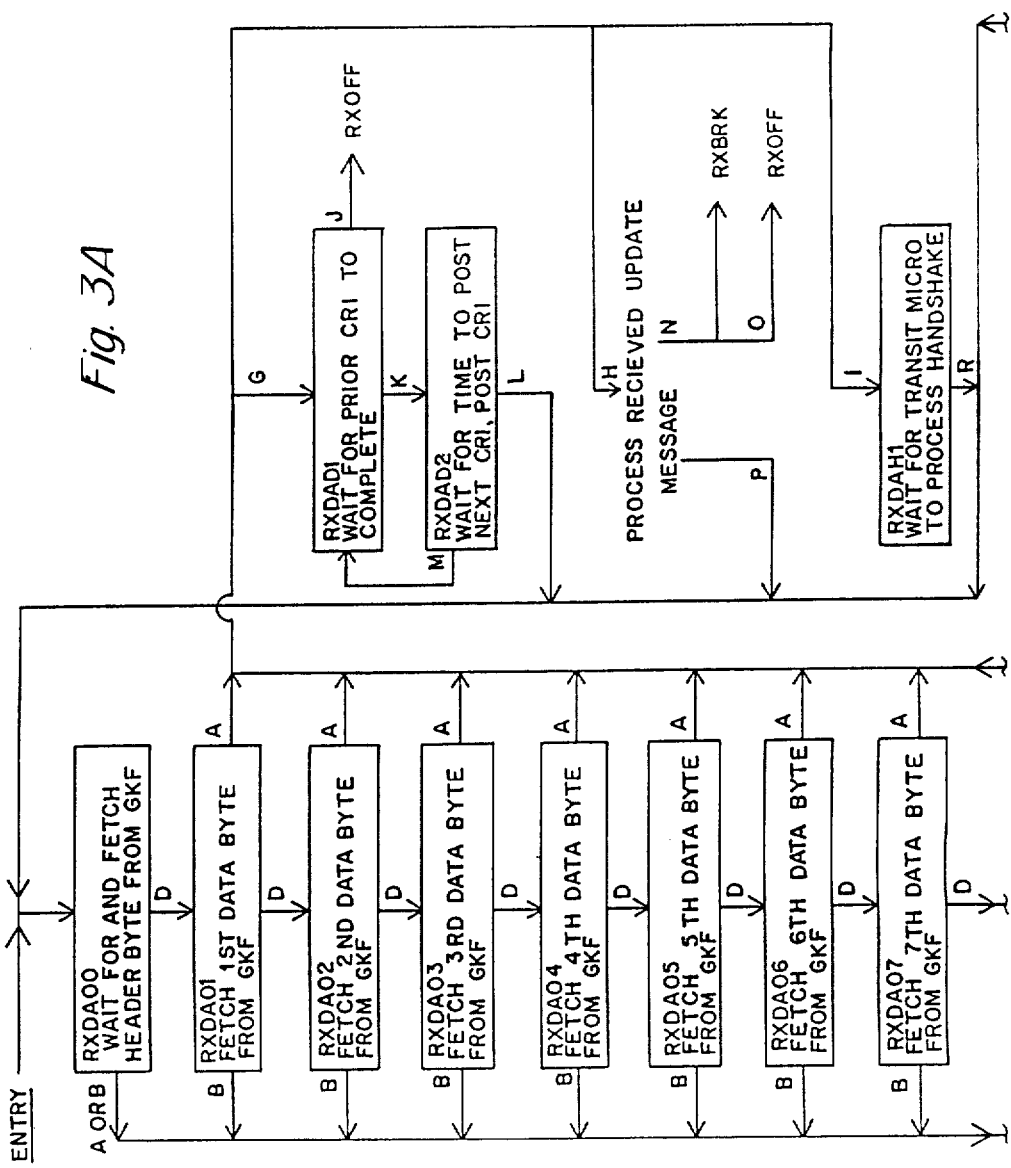
FIGS. 3A–3H are further, more detailed block diagrams of the states illustrated in FIG. 2.
Figure 3A:
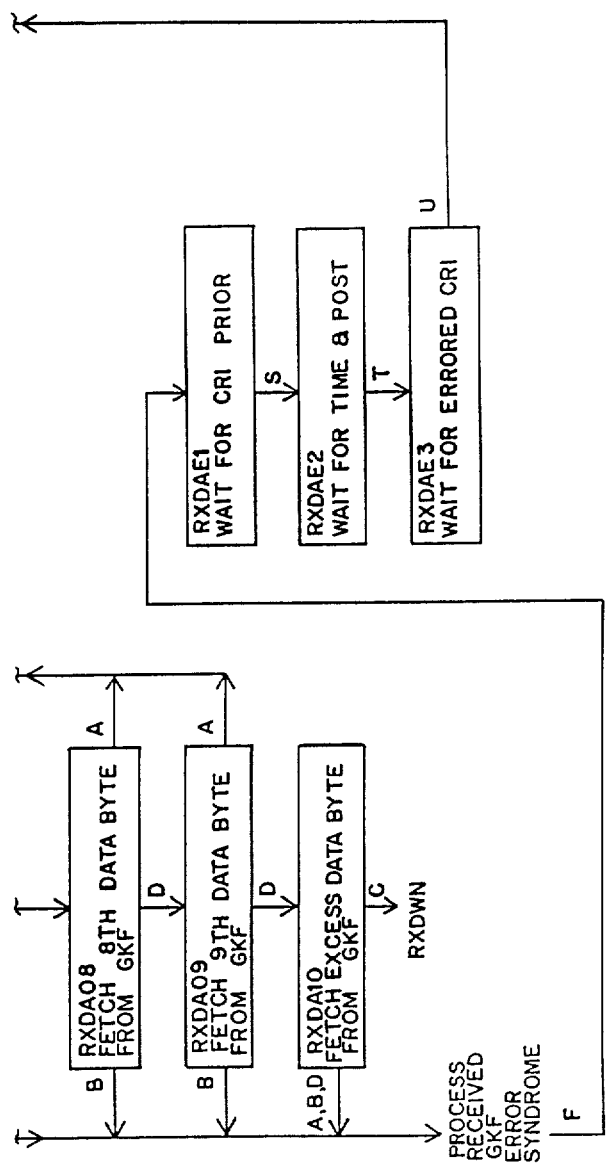
Figure 3B:
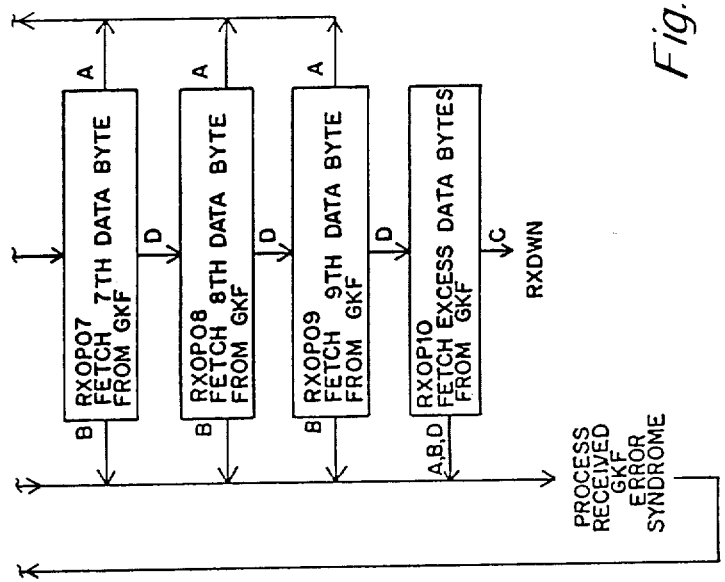
Figure 3C:
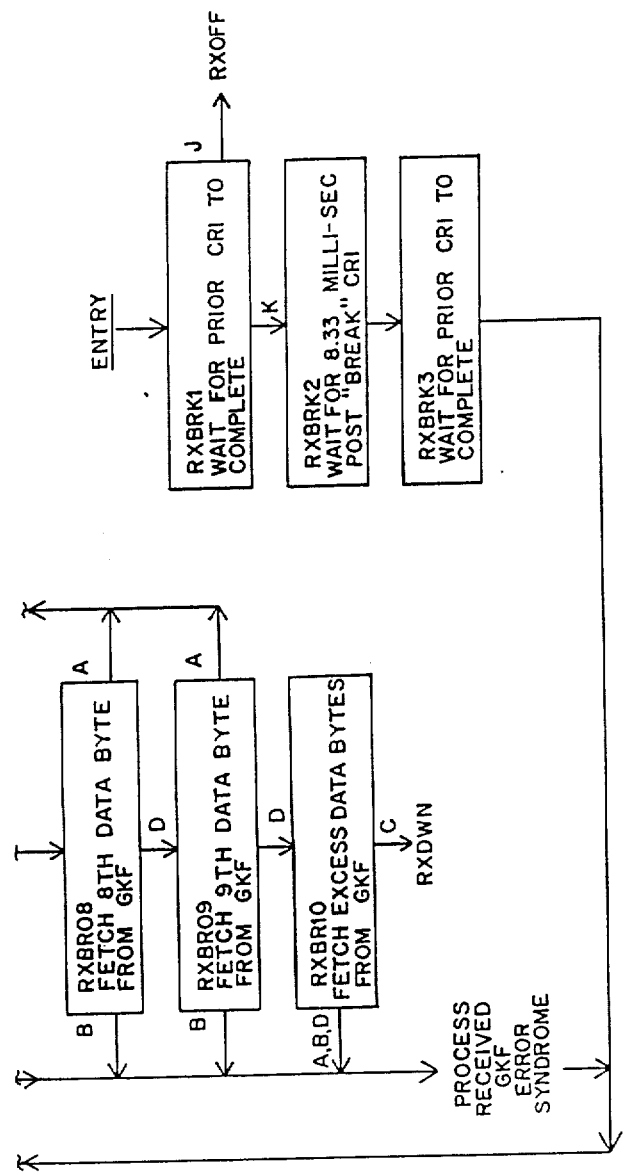
Figure 3D:
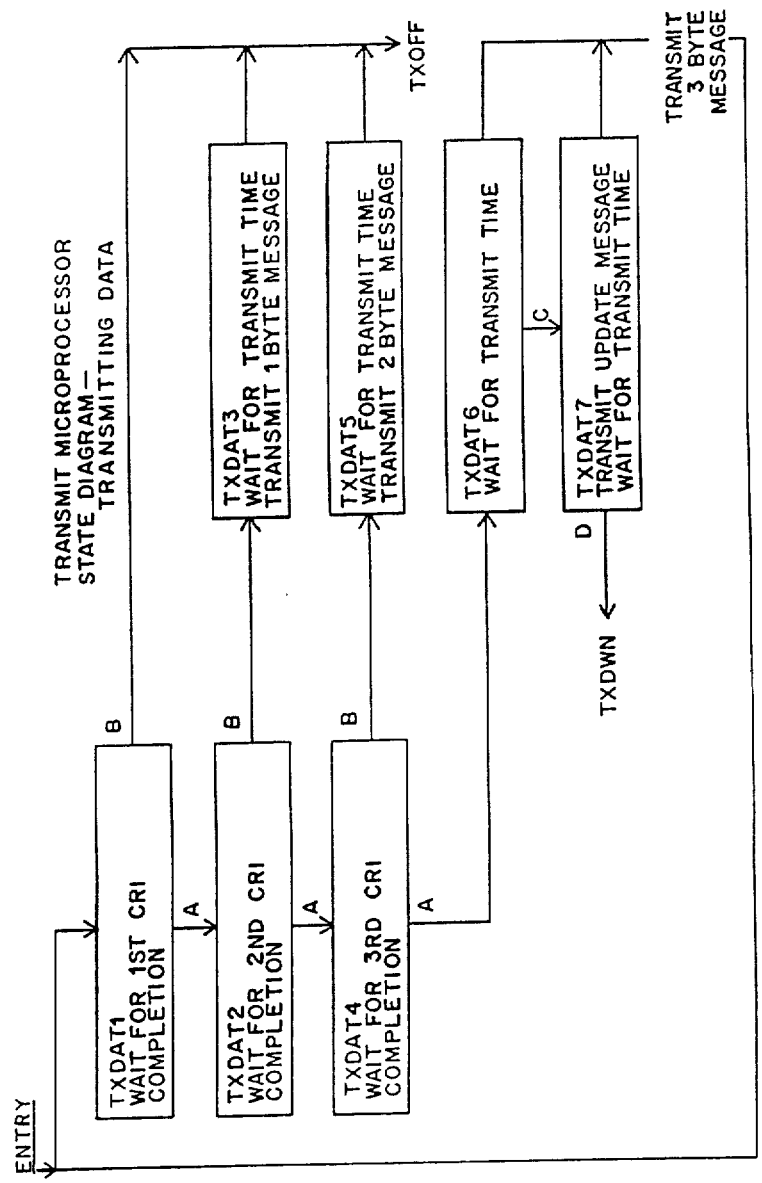
Figure 3E:
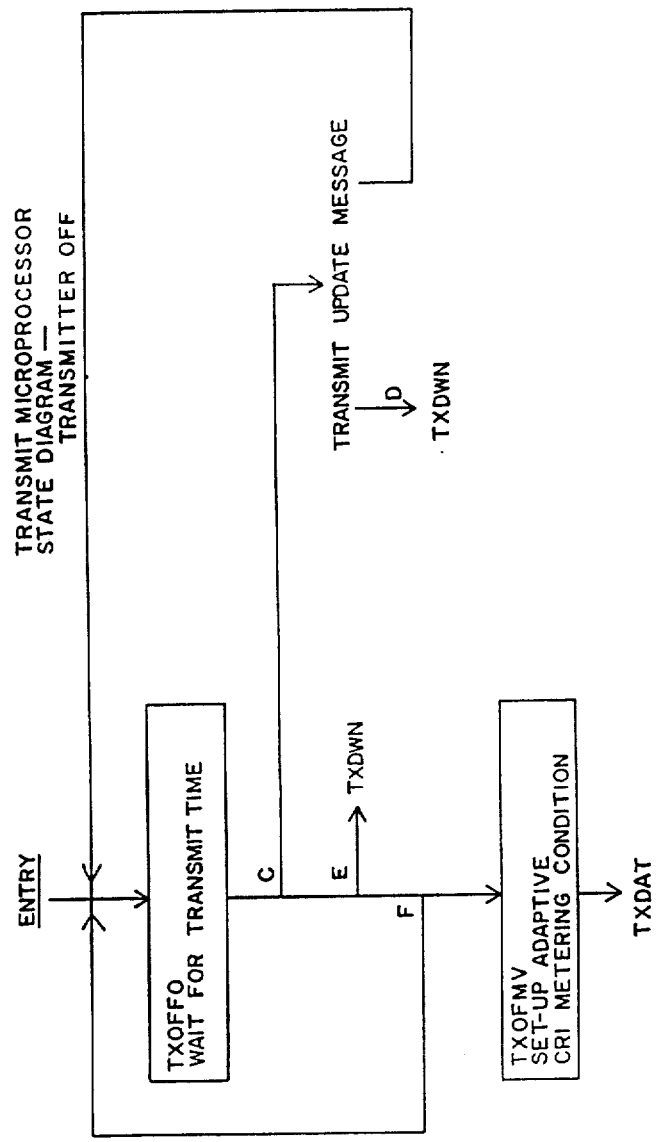
Figure 3F:
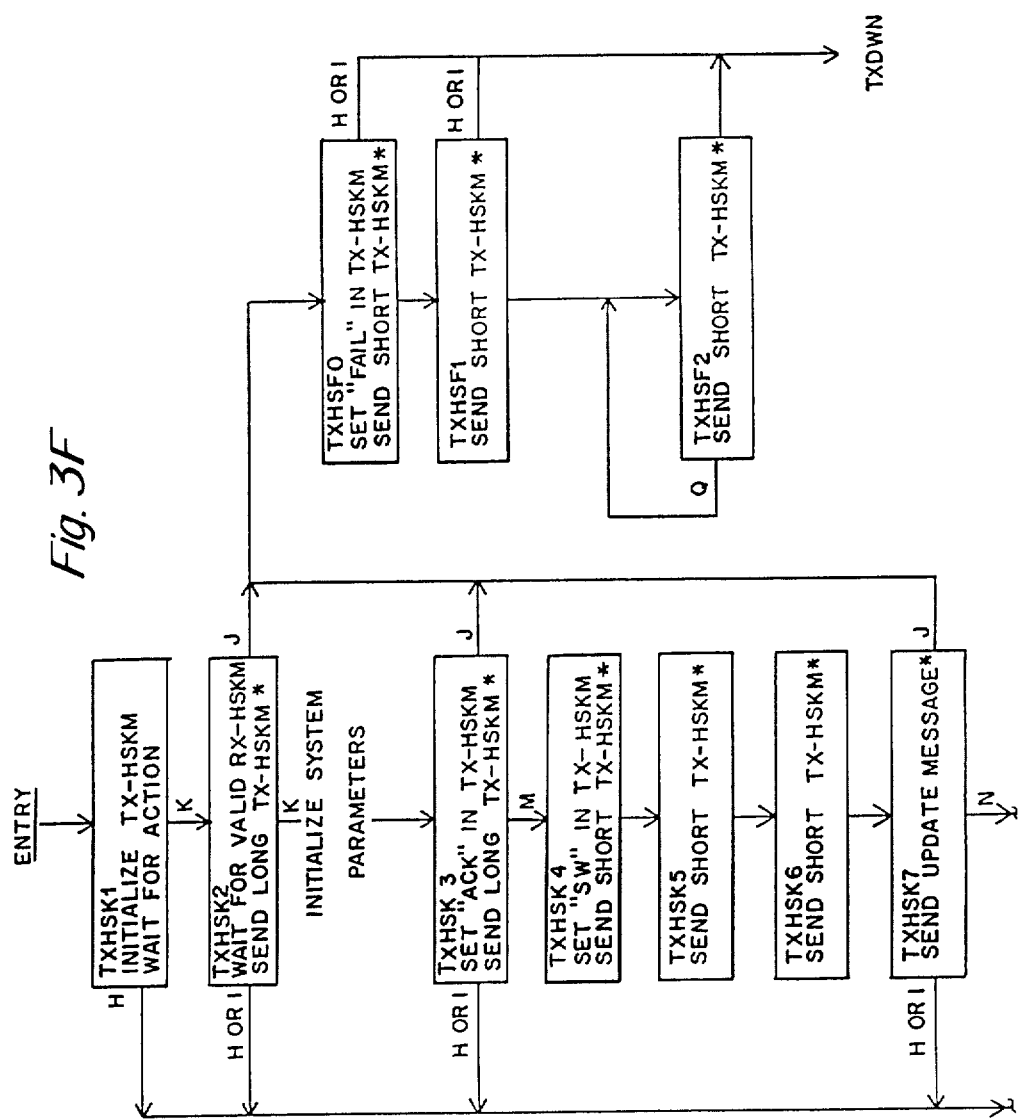
Figure 3F:
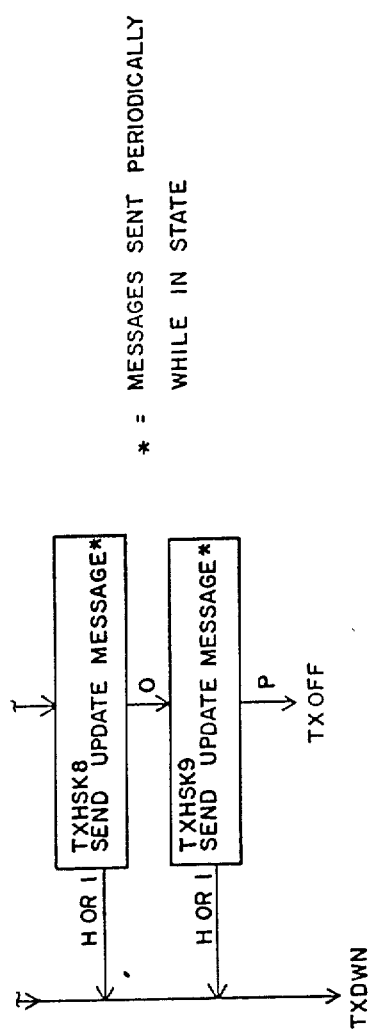
Figure 3G:
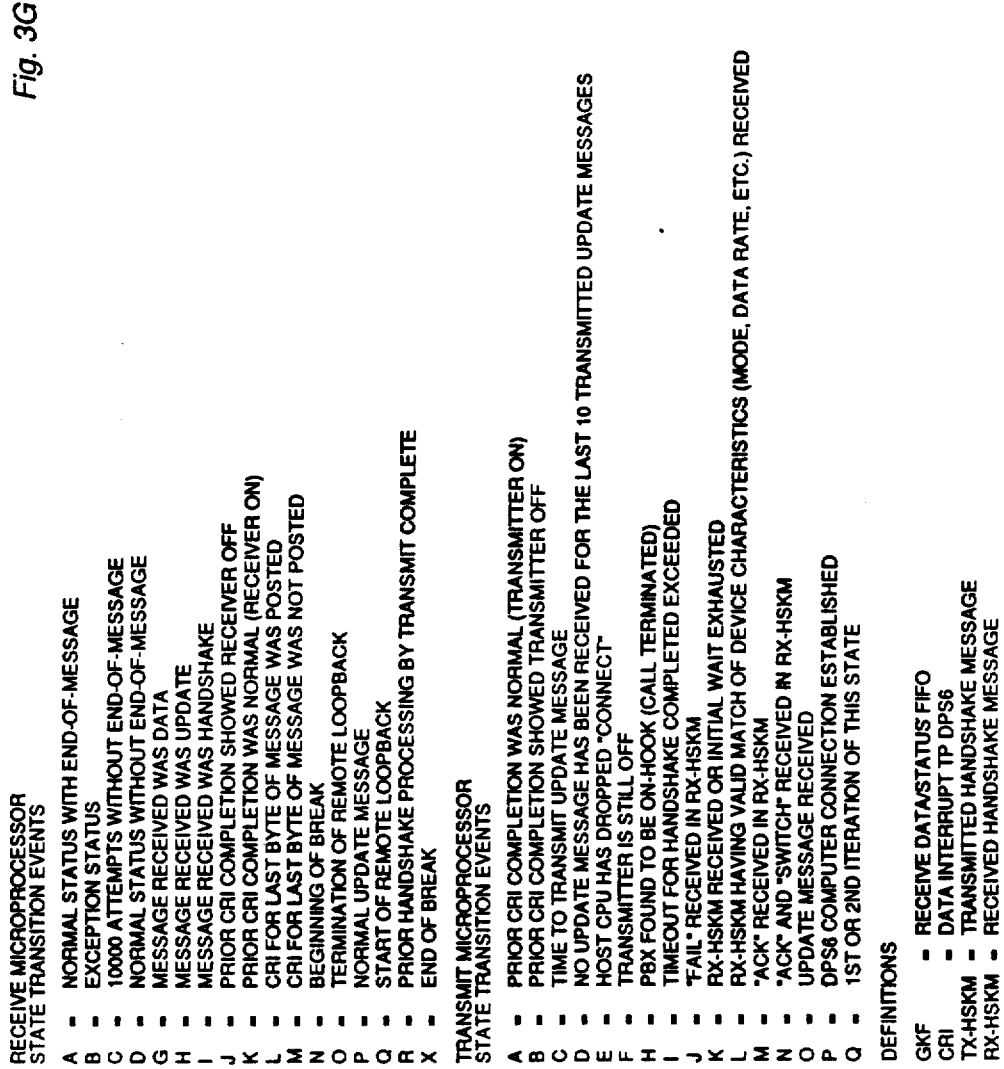

Reference is now made to FIGS. 3A-3H for a further explanation of the substates involved in each of the main states illustrated in FIG. 2. Reference is made in particular to FIG. 3G for an explanation of definitions associated with the substates and the transitions between substates. FIG. 3G illustrates the receive microprocessor state transition events as well as the transmit microprocessor state transition events.

In FIG. 3A there is illustrated the state RXDAT and the various substates, as illustrated. These include the substates RXDA00-RXDA10 as well as states RXDAD1, RXDAD2, RXDAH1, and RXDAE1-RXDAE3. Upon entering this state, one enters the substate RXDA00 (state 202) and that is the state where the first byte for each frame is detected. The data frame is constructed with a header byte and from one to nine data bytes. The state RXDA00 is a waiting state for the header byte to be received and come through to the microprocessor end of the receive fifo. This state is remained in as long as no byte is received. This state is left as indicated by the arrows departing therefrom. The event to the left indicates an error. Note in FIG. 3A that this is illustrated by the events A or B. Again, refer to FIG. 3G.

The event B indicates that one is receiving status that indicates that there is an error of some sort. The event A occurs if there is an end of frame indication on that byte. It is inappropriate to see an end of frame of the first byte because every message by definition is at least two bytes long. In such cases, one leaves to the error process.

The bytes received in the state RXDA00 are stored in the header position of an assembly buffer in the line table. In the state RXDA01 (state 204) the same sequence occurs except that the first data byte is now being detected. Again, errors can send one to an error processing routine.

Following the state RXDA00 are the states RXDA01-RXDA09 (states 204-220, respectively) These correspond to the reception of the first through the ninth data bytes of the message.

One aspect of the firmware state machine is that a counter or address pointer does not have to be maintained, or anything else to indicate what byte is being received. That indication is known to the code itself. When a data byte is received and it happens to be in state RXDA02 (state 206), it is put in the second byte of the assembly buffer in the line table.

Similarly, when leaving to the right from these states it is known that a total message has been assembled. The number of bytes is known from the state that is resided in. If, for example, state RXDA03 (state 203) is left, one sets up an indicator that says there is a three byte message. Departure from state RXDA07 (state 216) indicates that it is a seven byte message. All of this saves time in terms of counting and indexing through the buffer as the information is stored.

Another indication, when reaching the state RXDA09 (state 220) is that if an end condition has not been received this indicates an error. The frame is too long. Upon entering state RXDA10 (state 222), data is continuously taken from the fifo until a legitimate end-of-message is received. If it is not received within a certain amount of time then the line is torn down. If it is detected then the error processing routine is entered wherein it is indicated to the DPS6 computer that a message has been received with an error. An error brings one into states RXDAE1, RXDAE2 and RXDAE3 which are error handling states.

State RXDAE1 (state 224) is a wait state for a prior CRI completion. State RXDAE2 (state 226) waits for the proper time and posts the CRI. State RXDAE3 (state 228) waits for that CRI with the error to complete and when completed one enters event U.

Under the normal case when from 1 to 9 bytes of data are entered, one enters the state RXDAD1 (state 230) which is the data delivery state. In all cases, the CRI is the interrupt that one causes to the processor. One has to wait to see that the prior interrupt has been completed before one can post the new one and when it has been completed, one then has to check a time before to try to meter the data as it is given to the computer to make sure that there do not occur interrupts that are too close together. One waits a period of time and posts the CRI and then there is a test on the indicator that was set as to how many bytes are in the message. This involves a counter which is counted down.

When the end of the data has been delivered then there is a return to event L in FIG. 3A which then brings one back around so as to fetch the next data frame. There is an event out of the state RXDAD1, as illustrated in FIG. 3A to the state RXOFF. This covers a condition in which the receiver has been turned off. If it has been turned off, the state is exited and state RXOFF is entered. If the receiver has not been turned off, event M occurs and interchange between states RXDAD1 and RXDAD2 (state 232) occurs for the appropriate number of times.

There is also another test that occurs in connection with PIG. 3A. When leaving the left hand set of states in FIG. 3A to the right hand set of states, there are essentially three different branches that can be taken. One is for data delivery, another is an update frame and then finally is the event H. This is where the state RXBRK is entered and there are also conditions under which the state RXOFF may be entered. Normally, one processes the update message which might have changed the data set status indicator and then returns to the data fetching state.

A third state on the right hand side in FIG. 3A is the state RXDAH1 (state 234). This is where the receiver is if a handshake message occurs. The handshake message typically happens at the beginning of a call. There are certain conditions where this can also happen in the middle of a call. When in the handshake, the data block that is recovered is kept in the buffer and the transmit microprocessor is forced into its handshake state. The messages that are received are passed through the transmit microprocessor for processing until the transmit microprocessor finally releases the receive microprocessor and then it goes back to the normal recovery of data.

Thus, FIG. 3A shows the basic internal flow of data in the state RXDAT. The most active states are those illustrated on the left in FIG. 3A. Generally speaking only a few microprocessor instructions are executed for each state and thus the time is kept down to a minimum for processing these characters.

Reference is now made to FIG. 3B for an illustration of the receive microprocessor state RXOFF. It is noted that this state includes the substates RXOF00-RXOF10 (states 250-270, respectively) along with a state RXOFH1 (state 272). It is noted that the states RXOF0-0-RXOF10 replicate the previously referred to states RXDA00-RXDA10 illustrated in FIG. 3A. Again, the state RXOF00 (state 250) has the task of looking for a header byte. Furthermore, it monitors the buffer for an indication which was inserted into the buffer to indicate when the receiver is turned on. Any time the receiver has turned that condition is detected and the state RXDAT is entered to cause the upcoming frame of data to actually be delivered to the DPS6 computer. Otherwise, the states RXOF00-RXOF10 do exactly the same thing as the corresponding states RXDA00-RXDA10.

In the state RXOFF much of the code is identical to the code used in the state RXDAT. Under the concept of the firmware state machine, the processing from substate to substate is carried out by a very simple test. The code is virtually identical between these two states as previously mentioned.

The other state illustrated in FIG. 3B is the state RXOFH1. It is noted that this portion of FIG. 3B is different than the corresponding section of FIG. 3A because the data delivery states are absent in the state RXOFF. If there is a data message at event G it is passed around and the message is discarded. The update and handshake messages are the same as in the state RXDAT. As indicated previously, the data delivery states are not there because there is no need to indicate errors to the DPS 6 computer because the computer is not looking for data. All errors just cause the block to be discarded until one comes around to the next one.

Reference is now made to the further set of substates illustrated in FIG. 3C. These are the substates for the main state RXBRK. The "break" state in terms of the data flow is very similar to the "off" state. Again, the data is discarded. It is noted in FIG. 3C that the data entry point is at the bottom of the diagram. This state is entered at the lower right position in FIG. 3C. This enters the states RXBRK1-RXBRK3 (states 302-306, respectively). One first waits for any prior CRI to be completed. One then waits a fixed amount of time to indicate the break signal to the processor, also waiting for that CRI to be completed. One then goes on again processing data. Any data blocks that occur, and typically they don't in the "break" state, but if they do, are discarded. In the update message reception one senses the return to the state RXDAT. The state RXBRK is always entered from the state RXDAT and one always leaves the state RXBRK back to the state RXDAT.

As far as the code is concerned, it is noted that all instructions that are carried out for instance in substates RXBR00-RXBR10 (states 308-328, respectively) are identical to those corresponding substates in the main states RXOFF and RXDAT.

Reference is now made to FIG. 3D. There is illustrated therein, the transmit microprocessor state diagram for the state TXDAT. Similarly, FIG. 3E illustrates the transmit microprocessor state diagram for the state TXOFF. In the state TXDAT essentially the reverse of operation on the receive side occurs. Characters are being received from the DPS6 computer. Messages are being assembled. Blocks of data are received up to 9 bytes but for various hardware reasons only three data bytes in a frame along with a header byte are sent. Thus, the longest frame that is transmitted in the state TXDAT is a four byte frame. In this regard, refer in FIG. 3D to the states TXDAT1, TXDAT2 and TXDAT4 (states 350-354, respectively). When in the state TXDAT1, the first CRI is being awaited. This might happen any time from a millisecond to hundreds of milliseconds after the state is entered. Two separate events are indicated out of this state including the event B. There are actually three events B out of the three separate states as illustrated in FIG. 3D. The other exit from these states is by the event A which is the progression when one actually has data. Again, in the state TXDAT1 (state 350) the data received is placed in the first byte of the message buffer. Next is the state TXDAT2 (state 352) where there is a wait for the next data to be delivered. When it is delivered it is put in the second byte of the buffer and the system then proceeds on to state TXDAT4 (state 354) where it waits for the third byte and this is inserted in the third byte position of the data buffer. This is a normal flow when three bytes in a row have been received. When that concludes the control then transitions to the state TXDAT6 (state 356). This is a waiting state.

The system of the present invention has the capability of transmitting data far faster than most terminals can receive the data. There is a wait for a period of time which is established at handshake time and which is one character time per character, the data rate that the receiving terminal is operating at. There is a wait for essentially three character times to elapse from the time one sends the message. From state TXDAT6 there is a further test and then a step to state TXDAT7 (state 358). Refer to event C in FIG. 3D. The substate TXDAT7 is assumed if it is time to send an update message. These messages have to be sent periodically, typically every 1.5 seconds. In state TXDAT6, while waiting for transmit time, which indicates not only that the receiving terminal can receive it but that it has cleared the sending apparatus, then one can give it a new message if the previous frame has been closed. If it is an update time, the update message is first transmitted and then there is a waiting period after that for the transmit time to elapse so that the data message can be sent. When that is completed then there is an exit and it is indicated in FIG. 3D and the 3 byte message is sent. Again, in the update message waiting state, conditions are sensed which will cause the system to go to the state TXDWN. There are two conditions upon which this can occur. One occurs when the call has been dropped. One senses the PBX line having gone on-hook. The other condition is that messages have not been received for some period.

In connection with update messages, the receive microprocessor and the transmit microprocessor coordinate with a counter and if a certain number of update messages are sent without having received them then it is known that the terminal adapter at the other end for some reason has broken or been unplugged and thus the line is then torn down. In the absence of this condition either the state TXDAT6 or TXDAT7 are left and the 3 byte message is transmitted. Thereafter, the flow goes back to the state TXDAT1 where the system then starts to pick-up the subsequent message from the DPS6 computer Reference has been made hereinbefore to the event B from the substates TXDAT1, TXDAT2, and TXDAT4. These events indicate that the transmitter has been found to be off. From state TXDAT1 if the transmitter is off then one has no data to send and thus the operation reverts immediately to the state TXOFF. From the state TXDAT2 where we have already accumulated 1 byte of data, the system then reverts to the state TXDAT3 (state 360) where it waits for the transmit time and then sends that message with one data byte in it.

Similarly, if exit occurs at event B from state TXDAT4 senses the transmitter off and we have thus accumulated 2 bytes of data. The state TXDAT5 (state 362) is entered causing a wait to occur for the transmit time. This causes a 2 byte message to be sent and then the system proceeds to the state TXOFF.

Again, it is noted that these transitions described in connection with FIG. 3D, from state to state occur with no requirement for the saving of context. We do not have to remember whether we have accumulated bytes, how many data bytes or how many data bytes have to be sent prior to going to the state TXOFF. With the firmware state concepts of the present invention, if we are in state TXDAT5 and one knows that there are two characters in hand to be transmitted, one is simply waiting for the right time to be able to send those messages off. Furthermore, one knows that as soon as the message has been transmitted then one proceeds to the state TXOFF.

The control in the state TXDAT, as illustrated in FIG. 3D is important because this is the state in which the computer can be handling 16 different lines giving full data transfer streams for up to 16 terminals at high speed. It is thus in this state that one wants to keep the total processing per character as low as possible. This time is between about 45 and 50 microseconds per character which is well under the limit of 60 microseconds for 9600 bits per second.

Next, reference is made to FIG. 3E for the transmit microprocessor state diagram for the state TXOFF. It is noted that this particular state is separated into two substates including the states TXOFF0 (state 370) and TXOFMV (state 372). In state TXOFF one waits for transmit time conserve time resources. It is necessary to periodically monitor various aspects of the DPS6 computer interface. The state TXOFF is used periodically to monitor conditions. When the transmit time is off one looks at the state or interface and if nothing has changed the system remains in the state TXOFF and waits for another character time.

In actuality, during these waiting periods, the suspend feature comes into play. The system tests only long enough to determine whether it is time to take a particular action. If it isn't then the system immediately suspends. The system expends only about 10 or 12 microseconds in that state and that conserves a great deal of processing time. In other cases, the system periodically looks for an update time and sends and update message just as was carried out in the related state TXDAT.

Another instance occurs when we transition from state TXOFF0 to TXOFMV. This occurs when the computer desires to transmit more data. It is detected that the transmitter turns back on. One then goes through a state called TXOFMV which is a metering vector set-up state. At times one is responsive in particular to the receive metering rate changing. It is sensed at a point so that one does not have to test for it on every character. One might set-up a different metering time and then always proceed to state TXDAT as indicated at the output from the substate TXOFMV in FIG. 3E.

Figure 3H:
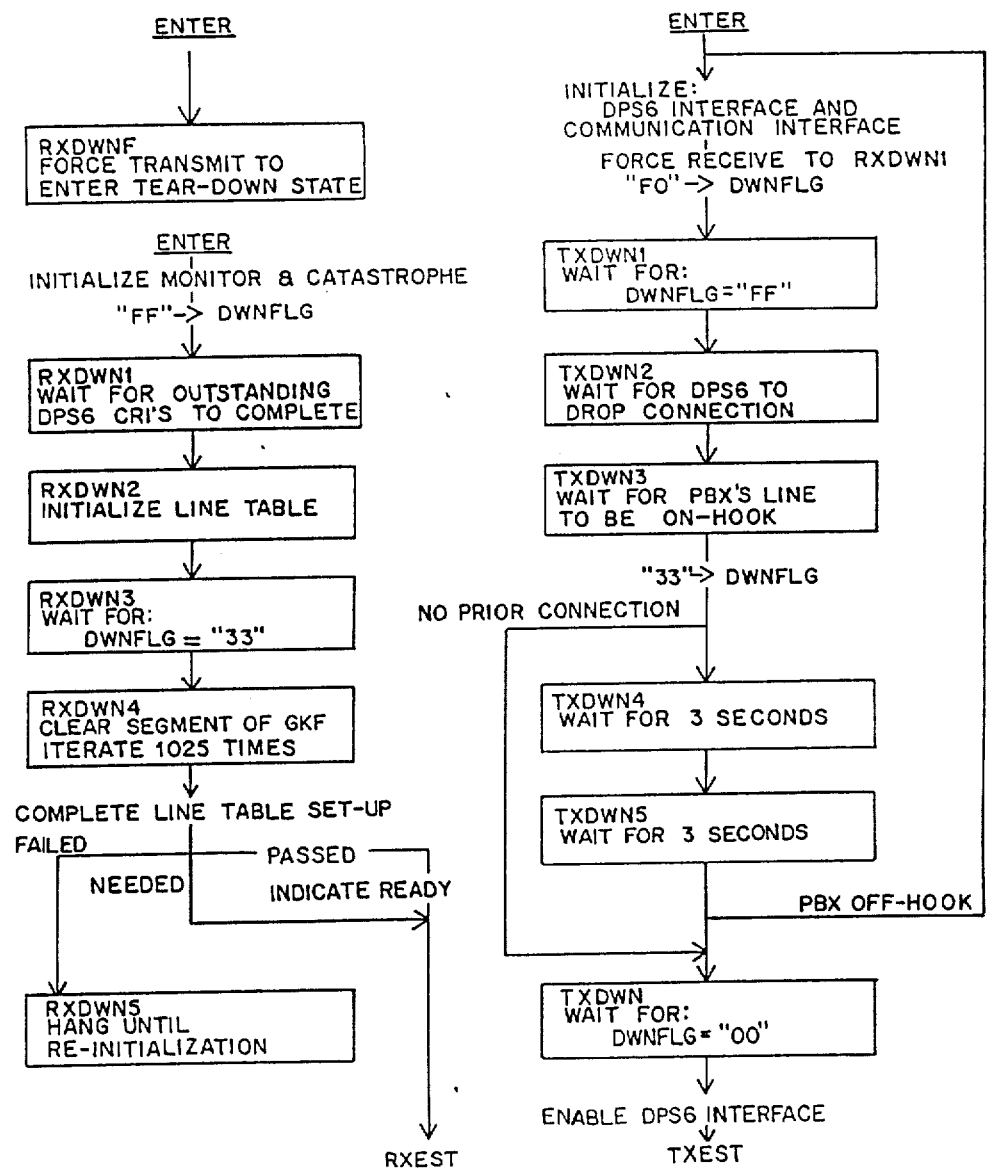

Reference is now made to FIG. 3H for an illustration of the substates associated with both the main states TXDWN and RXDWN. These states are basically entered following initialization or alternatively at any time that the line wants to be torn down. On the receive side, the substates are RXDWF (state 402), and RXDWN1–RXDWN5 (states 404–412, respectively). On the transmit side the states are the states TXDWN1-TXDWN6 (states 414–424, respectively).

On the receive side the state RXDWNF (state 402) has its sole job to force the transmitter to enter teardown. If the receiver finds the teardown situation it enters its state RXDWNF which is just a dead end state. However, what it does do is, by changing the suspend address for the transmitter, it will find itself in the state TXDWN at the beginning of the sequence.

The transmitter forces the receiver into the state RXDWN. This is illustrated in FIG. 3H by entry to the state RXDWN1 (state 404). In each case the state machine concepts have been used in each microprocessor to force the other microprocessor into a particular state.

There is a flag that is used to synchronize the progression of the states. This is referred to as the down flag and is identified in FIG. 3H as the signal DWNFLG. When the transmitter enters its "down" state it puts a hexidecimal value of the F0 into the flag and then enters state TXDWN1. It waits there for the signal DWNFLG to become equal to the value "FF". When the receiver finds itself in the "down" state, it initializes certain aspects of the machine and then it sets the flag to "FF". Now, both transmitter and receiver leave that state.

The next step in the sequence is that the transmitter is in a waiting state waiting for the PBX line to be on-hook. This assures that the connection is fully dropped before one proceeds through the "down" state.

While the transmitter is detecting if the line connection is completely dropped, the receiver in state RXDWN1 first waits for an outstanding CRI to be completed and when it has been completed it proceeds to initialize the line table. It waits for completion and then it initializes the line table, it sets the 256 bytes of storage in the line table. The receiver zero's out most of that, sets some things to some intial values, and leaves certain values alone that have to be maintained from call to call. The receiver then proceeds to wait for the signal DWNFLG to initiate the value of 33, which is an arbitrary value. On the tranmitter side, when there is assurance that the connection is dropped, note the substate RXDWN3 (state 408) where the signal DWNFLG is equal to "33". The significance of this sequence is that, when the connection is guaranteed to be dropped, there is no new data coming into the receive fifo. When the receiver sees the flag of "33" it then goes into state RXDWN4 (state 410). This is the state in which one now proceeds to clear the fifo. It iterates that 1025 times clearing out 4 bytes each time. The fifo has a capacity of 4096 bytes. When the receive fifo is fully cleared then there is a final stage of line set-up. On the receive side there are some tests that are indicated having to do with some self test aspects. The system then proceeds to the established state, namely state RXEST. If the self test is completed and fails then one reverts to the state RXDWN5 (state 412). The system is essentially hung-up in that state and cannot leave that state until the machine is initialized with the master clear.

In FIG. 3H on the transmit side there are a series of time-outs that occur. A rule has been established that when the line has been dropped, one will not reconnect it for at least six seconds. Doing this guarantees that old connections have been terminated for a sufficient period of time. If there is no connection at the time then one bypasses the two delays as indicated by the bypass line in FIG. 3H. The final thing that happens is that on the transmit side there is a check for the signal DWNFLG to be equal to zero. From there one exits to the transmit establish state, namely state TXEST. The receiver is guaranteed to clear its "down" states first and then it enables the transmitter to finish. It then reenables the DPS6 interface for a new call and then reverts to a transmit establish state or it sits there waiting for the telephone to ring.

Another aspect of the firmware state machine is the handshaking state. This is illustrated in FIG. 3F including the states TXHSK1-TXHSK9 (states 450-468, respectively) and also the states TXHFS0-TXHFS2 (states 470-474, respectively). The handshaking is a process that is carried out between the transmitter and the terminal adapter that is attached to the terminal on the other end of the PBX. The connection has been made by the PBX and now one provides a dialog between the controller and the terminal adapter to determine whether one goes into a dialog and continues to process. In the initial handshake substate TXHSK1 (state 450) one sets up an initial handshake message and then waits for a period of time to detect some indication of action before transmission occurs. The initial state is there to make sure that one does not start transmitting too soon as the first message may then be garbled. The next state is the handshake TXHSK2 (state 452). In this state we refer now to the sending of messages at prescribed intervals such as at 15 milliseconds apart. In this state the system is waiting for the receiver to receive something that follows the basic format of a handshake message. This is a message of 8 or 9 byte length which fully describes the condition of the machine. When one has received the first handshake message from the receiver it sets up negotiable data rates. Basically, in the long handshake message there are a number of data rates at which one can operate. Typically, on the receive side one gets an indication of one data rate, the data rate that the terminal is set-up for. There is a matching process that goes on to pick the highest rate at which both ends of the line can operate. Essentially, in the second handshake state one has negotiated a common data rate and now entry occurs to the third handshake state namely state TXHSK3 (state 454). An acknowledgement bit in the handshake message is sent to indicate to the other side that one has received the message.

The rules of the protocol indicate that when one sends the short handshake message one has to send it three times in a row to guarantee that it is received on the other side. One proceeds through three states each of them waiting for the 15 millisecond interval to pass and then sends out the short handshake message. When one has completed that then one sends out the first update message which indicates the data sent status. In this connection, note in FIG. 3F the subsequent steps TXHSK4-TXHSK7 (states 456-462, respectively).

The system then goes into state TXHSK8 (state 464) where one continues to send the update message while waiting for an up-date message. The next state proceeded to is state TXHSK8 and from there to state TXHSK9 (state 468). In state TXHSK9 update messages are continuously sent and one is waiting for the DPS6 to acknowledge that it has seen the connection. When this occurs one leaves the handshake mode and goes into the state TXOFF.

In the series of states previously mentioned, it appears that the system is going through the same conditions but the exit conditions are different and therefore different conditions are tested for. First, for the completion of the handshake protocol in state TXHSK7, for the reception of the first update message in state TXHSK8, and for the acknowledgement of the connection by the DPS6.

Now, in all cases, there is a failure event and the failure event is listed as either at H or I. The event H indicates that one has sensed the PBX to be on-hook mean that somewhere in the middle of the operation there has been a hang-up. The event I indicates that one has had a time-out as the messages were sent at 15 millisecond intervals.

In each case, one moves along through the states as the handshaking protocol progresses in terms of establishing and insuring a relationship. At any given time, one has another exit event in which a fail bit can be received. This says that the other terminal adapter has, not matched our characteristics. This involves the states TXHSF0-TXHSF2 (states 470-474, respectively) in FIG. 3F.

When one receives a fail, then one has to again send a handshake message which acknowledges that failure has been received. This has to occur three times. The fail bit is sent. There is a wait for acknowledgment and then it is sent three more times before proceeding to the state TXDWN which is the "down" transmit state.

Reference is now made to FIG. 5A for a listing of one example of firmware instructions in the system of the present invention that is representative of the firmware state concepts of the invention. In this connection also refer to FIG. 3H and in particular the state RXDWN4 which is involved with the clearing of the fifo. In this regard also refer to FIG. 1 and the fifo 60. It is in this state RXDWN4 that the fifo is cleared, a piece at a time. The fifo is cleared four bits at a time. If one attempted to clear the entire fifo at one time it would take up to 16 milliseconds assuming 4000 bytes of data and 4000 bytes of status. This is too long a period of time. This period of time is 16 character times for each one of the other data lines. Thus, one cannot allow the system to tie up the processor time for 16 milliseconds.

The clearing of the fifo occurs under firmware control as set forth in FIG. 5A in the listing presented therein. FIG. 5A describes the actual instructions that are exercised in the state RXDWN4.

Figure 10:
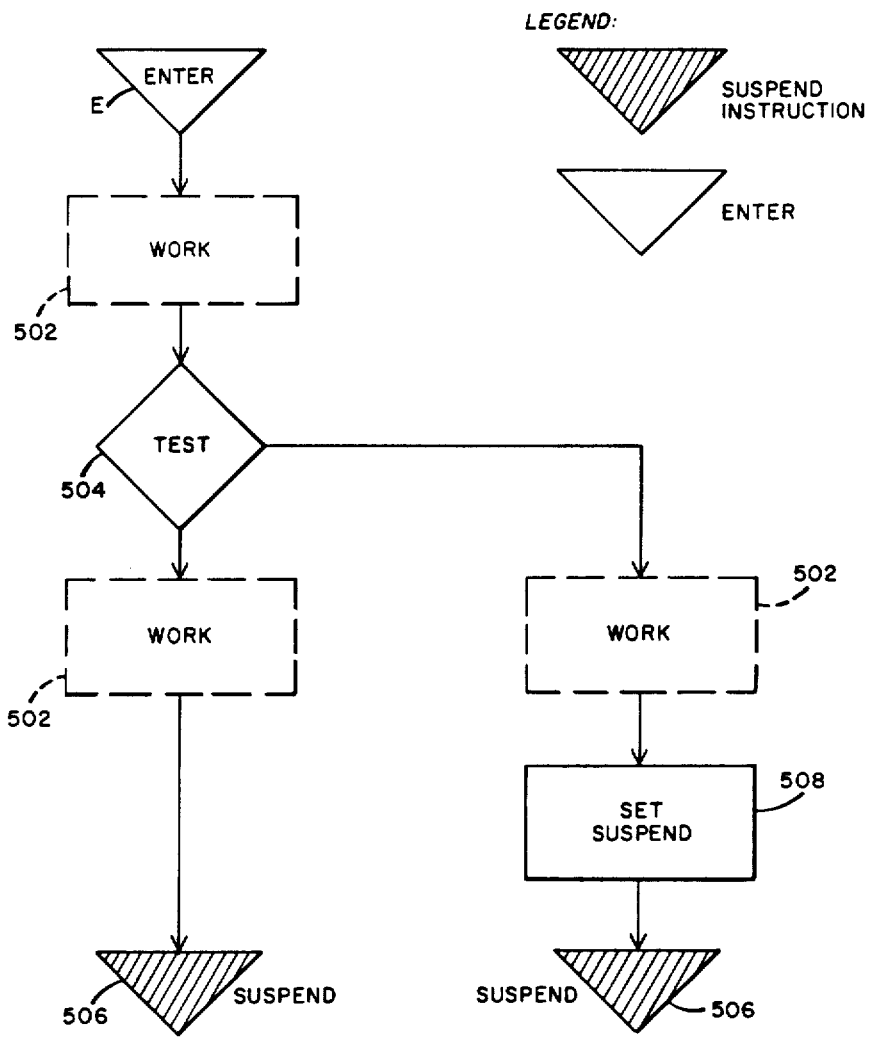
FIG. 10 is a schematic block diagram illustrating the flow of instructions in connection with a particular firmware state.

In connection with the firmware listing of FIG. 5A also refer to the schematic block and flow diagram of FIG. 10. This illustrates the sequence of instructions in connection with a particular-state illustrating the entry point E. Upon entering a state work may be carried out as indicated by the block 502. This has been shown in dotted outline to indicate that in accordance with the particular predefined state there may be initial work or not. Thus, in FIG. 10 the blocks 502 are shown in dotted outline to indicate that they are optional for a particular state.

Also illustrated in FIG. 504 is the diamond shaped block 10 indicating a test being carried out. This test, as it relates to the listing of FIG. 5A, may be the test to determine whether the fifo is completely cleared or not. If it is not cleared then additional work may be carried out, as indicated by the block 502 under the test block 504. This additional work would be a clearing of four more bits of the fifo. Thereafter, one goes to a suspend as indicated by the symbol identified by 506 in FIG. 10.

It is also noted that from the test block 504 there is another path by way of the block 502 to the block 508 which indicates that a suspend is being set. This is also illustrated in FIG. 5A at the state RXDWN3

In FIG. 10, this diagram is meant to be a general diagram indicating the different options that can occur with the firmware state concepts of the present invention. Thus, the branch to the right of the test block indicates that one can set a suspend address and thereafter suspend. As a matter of fact, this occurs in FIG. 5A wherein at the top thereof a suspend is set and at the bottom thereof a suspension occurs. Thus, there may be work accomplished, and usually is, between the setting of a suspend and the carrying out of a suspend.

In connection with the diagram of FIG. 10, the setting of a suspend is carried out by setting a new program counter address in the particular line table. This now means that when the processor returns again to this particular line table, processing resumes at the suspend address. The symbol identified by 506 in FIG. 10 is indicative of the actual carrying out of a suspend as illustrated by the last three instructions in FIG. 5A to be described in further detail hereinafter.

Actually, in FIG. 5A the first instruction that is shown is the instruction related to the exit from the state RXDWN3. That instruction moves the address of RXDWN4 to an address by register A4. This sets the suspend point. This suspend address is stored in the line table in a particular storage position. This sets up a return point for subsequent action in this particular line.

Now, when subsequently entering the state RXDWN4 a counter in the line table is first initialized to clear four locations of the fifo at a time. In this way, only 16 microseconds of the machine time are used instead of 16 milliseconds. The clearing task is carried out in 1000 or more iterations.

Therefore, what occurs is that four locations at a time are cleared and a counter is decremented. Then a test occurs to determine if the action is complete. If the action is complete then a branch occurs, taking operation out of that state and moving into the next state. This occurs after the fifo has been completely cleared. If one is not to branch because the task has not been completed, in other words, the fifo has not been cleared, at any one particular point in time, then one reverts to the three instructions shown at the bottom of FIG. 5A which provides the suspend feature. This is the microprocessor instruction set that actually implements the suspend.

There are three steps that are performed. The first one is labeled as the move of D0 into RXCHN(A3). This is a hardware strobe, address 12005. This clocks the line number register. Therefore, what this instruction does is cause the increment of the line number which normally, as we have described before, in the receive side increments by one and in the transmit side decrements by one. As explained previously, in either case if there is to be a collision there is a skipping over one count if the microprocessor happens to reside on a particular line at any one point in time.

The second of the last series of three instructions moves the word addressed by register A4. This is an index register which happens to be pointing to the place in the line table where one stores the address. If one goes back to the first instruction, one uses that same index register to store it. What this does is cause the contents of the memory location addressed by that register to be put in the register A5 and then the last instruction is a jump instruction. A jump to the program counter that is appropriate to the state where the next line is. This series of three instructions performs the entire job very simply. With the particular microprocessors that are employed, this series of three instructions only takes six or seven microseconds to execute. This is thus the only overhead that there is in switching from channel to channel and thus from line to line. This is a substantially smaller amount of overhead than 40 microseconds that would be involved in taking an interrupt, swapping status, and then in making further decisions.

Thus, in the operation illustrated in the firmware diagram of FIG. 5A, it is seen that a test of some sort is provided and the decision is made as to whether to stay in that particular state. One can suspend without changing the suspend address. In the example given, in order to completely clear the fifo, where it is only cleared 4 bytes at a time, then there will be many suspends but always going back to the same suspend address for that particular state which is the state RXDWN4 in the example given. The other alternative is that when a state has been completed then the next suspend address is set and the address that is saved off is then the suspend address of the next state.

If one were to freeze the machine at any given time, such as for logic analysis, one could observe the 16 line tables and find out precisely what each line is doing at the time that the observation was made. This can be determined simply by looking at the suspend address associated with each separate line table. Thus, in accordance with the concepts of the invention it may be thought of as involving two basic characteristics. One is to break-up the work load so that it is as efficient as possible to meet the 60 microsecond per line criteria. The other aspect is to break it up into small enough pieces so that no one line can monopolize the system as far as access is concerned.

Reference is now made to FIG. 5B for another example of the firmware control in accordance with the present invention. This example relates to the receive data state and in this regard it refers to FIG. 3A.

Figure 12:
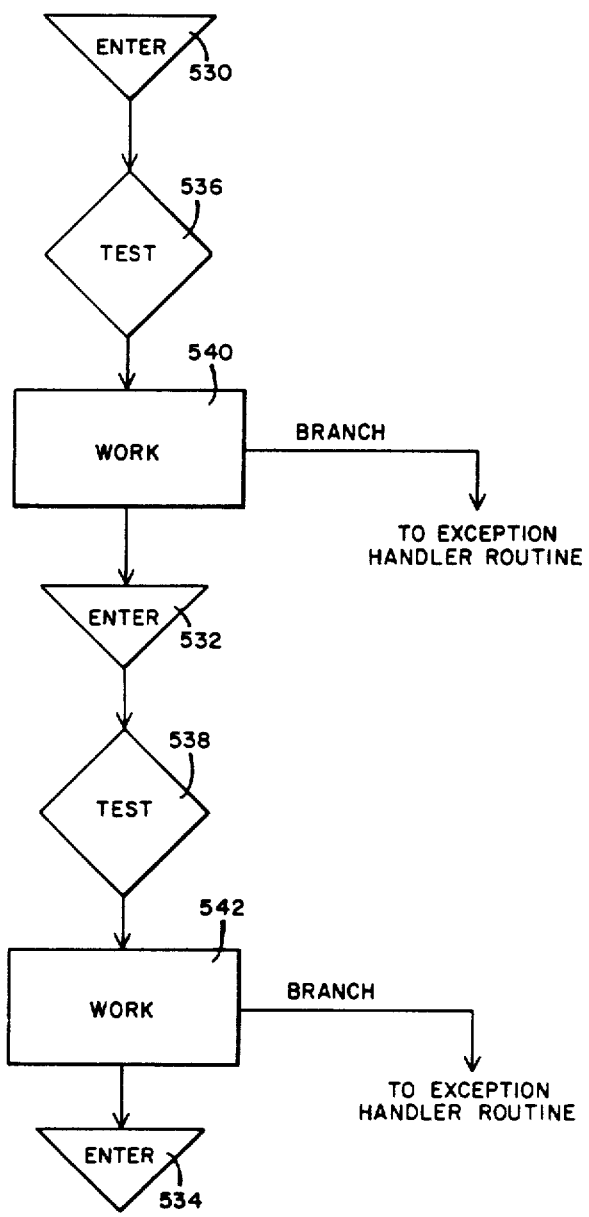
FIG. 12 is a further schematic block and flow diagram illustrating a sequence of transitions from state to state without the use of a suspend therebetween.

In connection with this state, also refer to the flow diagram of FIG. 12. This is a state in which there is a data transmission including from 1 to 9 bytes of data in each block. Because, once a byte is received there is a likelihood that subsequent bytes will be coming along, a decision has been made that suspends will not occur as long as data is coming in in proper form. This is illustrated in FIG. 12 wherein there is entry 530, 532, 534 into a state, followed by a test 536, 538 and then followed by certain work 540, 542. If conditions are satisfied then the system reverts to the next state where it is entered, tests occur and further work occurs such as storage of the byte of data.

As indicated previously, there is a data transmission which can include from 1 to 9 bytes of data in each block. Every block has a header associated with it and at the beginning of each block, there is a wait for the header to arrive. The initial state is state RXDA00 as indicated in FIG. 3A. This is a waiting state waiting for the header to arrive. Typically, this is a state in which a test is performed that asks whether there is anything in the fifo yet. If there is not, then a suspend occurs. If there is, that byte is taken out of the fifo and it is put into a buffer in the receive microprocessor. The particular message may have a header byte and up to 9 data bytes. Thus, there is provided 10 byte locations in the line table.

Thus, in state RXDA00 when the first byte comes in, it is put into the first position of that buffer which is where the header byte always appears. The tests are performed to determine whether one is to exit from a particular state when an end-of-message signal has been received. In the first position this is illegal as a single byte message is illegal and thus in that instance control leave to an error processing routine.

If on the other hand an error is not indicated, this being the first byte of data and there is not an end-of-message, then the next state is entered, namely state RXDA01. But in this state again, there is a test that asks whether there is another byte in the fifo. If there is, it is the first data byte of this message. If it is not, then there is a suspend and the sequence is re-entered again. If it is the first data byte, it is put into the corresponding location of the buffer. Thus, the bytes of data may be taken out and inserted in sequential locations in a storage buffer in the line table Next, reference is made specifically to FIG. 5B and the set of instructions in the middle of the listing. These are the instructions for the second data state, namely state RXDA02. When entering this second state, there is an instruction that says move GKARS(A3), D0. This reads the status. There is a test to see if it is the normal status of that state. The normal status of that state would be an end-of-message because most of the messages are short. One tests to see if it is an end-of-message. If it is not, then one branches away. If it is, then one reads the data byte. This is the fourth instruction. It is the instruction (A3), RXMSG2(A0). The index register A3 points to the location one reads to get the data byte. One moves that into RXMSG2 and that is the second location of the buffer (see FIG. 4). If we are talking about state RXDA03 then we move to (A3), RXMSG3(A0). This is the concept of imbedding the known number of which location one is at within the instruction. Thus, one knows where exactly to put the byte and then one clears the status and then in the next instruction one puts the number 2 in a location referred to in the listing as RXMSG2 (A0), because at the end of it one has to know how long it was. One does not have to know how long it is during the operation. One has to keep track of how long a block is when finished.

Now, this system has taken all the data, checked it and has determined a normal end-of-message and thus one enters the normal delivery state to send the message off. Had one taken the branch indicating that it was not an end-of-message, then one would have come down to a place where one tested for normal data status. If it is not equal to that, then one branches out. One then moves the data to the second byte, clears the status and then goes into the state RXDA03, the third data state.

In the case just given, one has not suspended in between these states and this is for efficiency purposes. It turns out that the data comes into the fifo at 125 microseconds, a byte apart. One finds statistically that if the first byte is there the rest of them are probably also going to be there. Thus, one does not do a suspend between each of these except in the case where we did not see either normal data or normal end-of-message status. Thus, one takes a branch off into a service routine where one does not see either normal data or end-of-message because there is nothing there yet. That state does a suspend for us and does this because at the beginning or at the point where one has entered that, data is not there. At that point, one saves off the suspend address, jumps into RXGKE, which is the exceptional handling program.

With more particular reference to FIG. 5B and the state RXDA02, it is noted that after reading the fifo status there is a test for a normal end-of-message. If there is not a normal end of message then there is a branch to the substate RXDA02C. Next is a test for normal data. If it is normal data then the byte is stored. Note under the substate RXDA02C in FIG. 5B the instruction (A3), RXMSG2(A0). This is followed by a clearing of the fifo, an increment take, and immediate transition into the next state RXDA03. Note that this has occurred without any suspension.

In state RXDA02A if there is a normal end-of-message then the data byte is stored as again indicated by the instruction (A3), RXMSG2(A0), data is then delivered.

In the event that it is not a normal end-of-message and furthermore it is not normal data, perhaps because the data has not been totally entered at this time, then there is a branch to the substate RXDA02B. Note that in this substate the first instruction is a setting of the suspend at RXDA02. This assures that subsequently upon entering this line again, it will be at this particular state, namely, RXDA02 state. The proper suspend address is set in the line table corresponding to the program counter address. The next instruction after the suspend set instruction is the instruction RXGKE(PC). This goes to an exception handler routine not described in detail herein. However, in this routine there is eventually a suspension so tht servicing of another line can occur. Again, when returning to this line again, the suspend address is set at the state RXDA02 for further testing.

In summary, thus, in FIG. 5A there has been shown a routine in which the suspend feature is used to transmit segments of data followed by a suspend. In FIG. 5B there has been shown the transition from one state to subsequent state without the need for a suspend.

Having now described a limited number of embodiments of the present invention, it should now be apparent that those skilled in the art of numerous other embodiments and modifications thereof are contemplated as falling within the scope of the present invention as defined by the appended claims.

What is claimed is:

1. A firmware state apparatus for controlling data transfer between a communication system having multiple independent data lines and a computer system, said apparatus comprising;

a transmit processor and a receive processor, a processor memory coupled to said transmit processor and said receive processor and having a plurality of firmware instructions for performing data transfer between each of said lines of the communication system and the computer system, said instructions being divided into a plurality of groups that establish a corresponding number of predefined states so that a transition from one state to another state is executed within a period of time which is small in comparison to the amount of time for servicing all of said lines, predetermined groups of instructions including at least one instruction defining a test operation for evaluating a condition related to one of said lines to control sequencing to a next one of the predefined states, a shared memory having a plurality of locations for line table information for said lines, said shared memory containing an address specifying a starting instruction of one of said groups of instructions, one of said processors, in response to a group of instructions performing a designated operation, and in response to said instruction defining a test operation as a function of said condition, accessing in said shared memory a starting address of another group of instructions, and control means for enabling conflict-free access to said shared memory by said transmit processor and said receive processor.

2. A firmware state apparatus as set forth in claim 1 wherein said one of said processors has a program counter and said at least one location of said shared memory contains a program counter address.

3. A firmware state apparatus as set forth in claim 1 wherein all of said predefined states are common to all data lines and wherein said groups of instructions are executed so that each data line utilizes the same predefined states.

4. A firmware state apparatus as set forth in claim 1 wherein said predetermined ones of said groups of instructions include, at a predetermined point, at least one instruction defining a suspend operation.

5. A firmware state apparatus as set forth in claim 4 wherein said one of said processors suspends operation on one line in response to said instruction defining a suspend operation for enabling said one of said processors to serve another line.

6. A firmware state apparatus as set forth in claim 5 wherein said suspend operation is defined by multiple instructions.

7. A firmware state apparatus as set forth in claim 4 further including additional instructions in predetermined groups of instructions for carrying out work tasks for enabling data transfer between said communication system and said computer system.

8. A firmware state apparatus as set forth in claim 1 wherein said processor memory comprises a programmable read only memory.

9. A firmware state apparatus as set forth in claim 1 wherein said shared memory has line table information for all data lines stored separately on a line-by-line basis.

10. A firmware state apparatus as set forth in claim 9 including means for controlling said one of said processors to access only one line table at a time in a predetermined sequence in which all lines are accessed.

11. A firmware state apparatus as set forth in claim 10 wherein each line table contains an address identified as a suspend address representative of the predefined state to be returned to upon attaining access to that data line again.

12. A firmware state apparatus as set forth in claim 1 wherein predetermined groups of instructions include at least one instruction for loading the starting address of a group of instructions into said one of said processors.

13. A firmware state apparatus as set forth in claim 1 wherein said predetermined groups of instructions include at least one instruction defining a suspend operation to carry out the suspending of operation on one line in response to said at least one instruction for enabling said one of said processors to return to said same line at a later time.

14. A firmware state machine as set forth in claim 1 wherein said predetermined groups of instructions include at least one instruction defining a suspend operation to carry out the suspending of operation on one line in response to said at least one instruction for enabling said one of said processors to service another line at a later time.

15. A method of controlling data transfer between a communication system having a multiple independent data lines and a computer system, said method comprising the steps of, providing a transmit processor and a receive processor, storing a plurality of firmware instructions for performing data transfer between each of said lines of the communication system and the computer system, said instructions being divided into groups that establish unique states used for servicing said data lines according to a specified protocol, each state defining those activities which can take place while in that state in addition to activities which can cause a transition to a next state, predetermined groups of instructions including at least one instruction defining a test operation for evaluating a condition related to one of said lines to control sequencing to a next one of the predefined states, providing a line table memory having a plurality of locations for line table information for said lines, said line table memory containing an address specifying a starting instruction of one of said groups of instructions, one of said processors, in response to a group of instructions, performing a designated operation, and in response to said instruction defining a test operation as a function of said condition, accessing in said line table memory a starting address of another group of instructions, and enabling conflict-free access to said line tables by said receive processor and said transmit processor.

16. A method of controlling data transfer as set forth in claim 15 wherein said predetermined groups of instructions include, at a predetermined point, at least one instruction defining a suspend operation.

17. A method of controlling data transfer as set forth in claim 16 including controlling said one of said processors to suspend operation on one line in response to said at least one instruction defining a suspend operation for enabling said one of said processors to serve another line.

18. A method of controlling data transfers as set forth in claim 17 wherein said suspend operation is defined by multiple instructions.

19. A method of controlling data transfer as set forth in claim 17 including providing instructions in said predetermined groups of instructions for carrying out work tasks for enabling data transfer between said telephone communication system and said computer system.

20. A method of controlling data transfer as set forth in claim 15 wherein said predetermined groups of instructions include at least one instruction for loading the starting address of a group of instructions into said one of said processors.

21. A method of controlling data transfer as set forth in claim 15 wherein said predetermined groups of instructions include at least one instruction defining a suspend operation to carry out the suspension of operation on one line in response to said instruction for enabling said one of said processors to return to said same line at a later time.

22. A method of controlling data transfer as set forth in claim 15 wherein said predetermined groups of instructions include at least one instruction defining a suspend operation to carry out the suspension of operation on one line in response to said instruction for enabling said one of said processors to service another line at a later time.

23. A state machine for controlling data transfer between a communication system including multiple independent lines and a computer system, said state machine comprising:
  first memory means including a receive memory section containing a receive instruction sequence for controlling data transfer from said lines to said computer system and a transmit memory section containing a transmit instruction sequence for controlling data transfer from said computer system to said lines, said receive and transmit instruction sequences each including a plurality of suspend operations at predetermined locations therein;
  second memory means including multiple line tables, one for each of said lines, each line table including a location for storing a suspend address; and
  processor means for executing one of said instruction sequences for a first one of said lines until a suspend operation is encountered, including means responsive to the suspend operation for storing a suspend address in the suspend address location of the line table for said first one of said lines, for accessing the suspend address in the line table for a next one of said lines, and for resuming execution of said instruction sequence at the suspend address specified in the line table for the next one of said lines, said processor means including a receive processor for executing said receive instruction sequence and a transmit processor for executing said transmit instruction sequence, said second memory means being shared by said receive processor and said transmit processor, said state machine further including control means for enabling conflict-free access to said second memory means by said receive processor and said transmit processor, whereby said state machine controls data transfer one each of said lines without having to respond to interrupts.

24. A state machine as defined in claim 23 wherein said control means includes means for time multiplexing access to said second memory means by said receive processor and said transmit processor.

25. A state machine as defined in claim 24 wherein said receive memory section and said transmit memory section comprise separate read only memories coupled to said receive processor and said transmit processor, respectively.

26. A state machine as defined in claim 24 wherein said control means includes means for causing said receive processor to service said lines in a first predetermined sequence and for causing said transmit processor to service said lines in a second predetermined sequence different from said first predetermined sequence.

27. A state machine as defined in claim 24 wherein each of said suspend operations includes at least one instruction in the respective instruction sequence.

28. A method for controlling data transfer between a communication system including multiple independent lines and a computer system comprising the steps of:
  (a) providing a receive instruction sequence for controlling data transfer from said lines to said computer system and a receive processor for executing said receive instruction sequence and providing a transmit instruction sequence for controlling data transfer from said computer system to said lines and a transmit processor for executing said transmit instruction sequence, said receive and transmit instruction sequences each including a plurality of suspend operations at predetermined locations therein;
  (b) providing multiple line tables, one for each of said lines, each line table including a location for storing a suspend address;
  (c) executing one of said instruction sequences for one of said lines until a suspend operation is encountered;
  (d) responding to the suspend operation in said instruction sequence by storing a suspend address in the suspend address location of the line table for said one of said lines;
  (e) accessing the suspend address in the line table for a next one of said lines;
  (f) resuming execution of said instruction sequence at the suspend address specified in the line table for the next one of said lines; and
  (g) enabling conflict-free access to said line tables by said receive processor and said transmit processor during execution of said receive instruction sequence and said transmit instruction sequence.

29. A method for controlling data transfer as defined in claim 28 including the step of repeating steps (c) to (f) until all of said lines have been serviced.

30. A method for controlling data transfer as defined in claim 28 wherein the step of enabling conflict-free access includes time multiplexing access to said line tables by said receive processor and said transmit processor during execution of said receive instruction sequence and said transmit instruction sequence.

31. A method for controlling data transfer as defined in claim 30 further including the steps of said receive processor servicing said lines in a first predetermined sequence, and said transmit processor servicing said lines in a second predetermined sequence different from said first predetermined sequence.

32. A method for controlling data transfer as defined in claim 28 further including the step of selecting the predetermined locations of said suspend operations such that all of said lines are serviced without excessive delay.

33. A state machine for controlling data transfer between a communication system including multiple independent lines and a computer system, said state machine comprising:
  a receive memory section containing a receive instruction sequence for controlling data transfer from said lines to said computer system;

a transmit memory section containing a transmit instruction sequence for controlling data transfer from said computer system to said lines, said receive and transmit instruction sequences each including a plurality of suspend operations at predetermined locations therein;

a shared memory including multiple line tables, one for each of said lines, each line table including a location for storing a receive suspend address and a transmit suspend address;

a receive processor for executing said receive instruction sequence for one of said lines until a suspend operation is encountered, said receive processor including means responsive to a suspend operation for storing a receive suspend address in the suspend address location of the line table for said one of said lines;

a transmit processor for executing said transmit instruction sequence for a different one of said lines until a suspend operation is encountered, said transmit processor including means responsive to a suspend operation for storing a transmit suspend address in the suspend address location of the line table for said different one of said lines, said receive processor and said transmit processor each including means for accessing the respective suspend address in the line table for a next one of said lines and for resuming execution of the respective instruction sequence at the suspend address specified in the line table for the next one of said lines; and control means for enabling conflict-free access to said shared memory by said receive processor and said transmit processor, whereby said state machine controls data transfer on each of said lines without having to respond to interrupts.

34. A state machine as defined in claim 33 wherein said control means includes means for time multiplexing access to said shared memory by said receive processor and said transmit processor.

35. A state machine as defined in claim 34 wherein said control means includes means for causing said receive processor to service said lines in a first predetermined sequence and for causing said transmit processor to service said lines in a second predetermined sequence different from said first predetermined sequence.

36. A method for controlling data transfer between a communication system including multiple independent lines and a computer system comprising the steps of:
  (a) providing a receive instruction sequence for controlling data transfer from said lines to said computer system;
  (b) providing a transmit instruction sequence for controlling data transfer from said computer system to said lines, said receive and transmit instruction sequences each including a plurality of suspend operations at predetermined locations therein;
  (c) providing multiple line tables, one for each of said lines, each line table including a location for storing a receive suspend address and a transmit suspend address;
  (d) executing said receive instruction sequence for one of said lines until a suspend operation is encountered and responding to a suspend operation in said receive instruction sequence by storing a receive suspend address in the suspend address location of the line table for said one of said lines;
  (e) executing said transmit instruction sequence for a different one of said lines until a suspend operation is encountered and responding to a suspend operation in said transmit instruction sequence by storing a transmit suspend address in the suspend address location of the line table for said different one of said lines;
  (f) accessing the suspend address in the line table for a next one of said lines;
  (g) resuming execution of the respective instruction sequence at the suspend address specified in the line table for the next one of said lines; and
  (h) enabling conflict-free access to said line tables during execution of said receive instruction sequence and said transmit instruction sequence.

* * * * *